US011102984B2

(12) United States Patent
Shinde et al.

(10) Patent No.: US 11,102,984 B2
(45) Date of Patent: Aug. 31, 2021

(54) LAMINARIA BASED COMPOSITIONS FOR BENEFITTING PLANTS AND METHODS OF APPLICATION

(71) Applicant: HELIAE DEVELOPMENT LLC, Gilbert, AZ (US)

(72) Inventors: Sandip Shinde, Gilbert, AZ (US); Michael Warner, Phoenix, AZ (US)

(73) Assignee: Heliae Development, LLC, Gilbert, AZ (US)

( * ) Notice: Subject to any disclaimer, the term of this patent is extended or adjusted under 35 U.S.C. 154(b) by 0 days.

(21) Appl. No.: 16/487,353

(22) PCT Filed: Feb. 23, 2018

(86) PCT No.: PCT/US2018/019345
§ 371 (c)(1),
(2) Date: Aug. 20, 2019

(87) PCT Pub. No.: WO2018/156843
PCT Pub. Date: Aug. 30, 2018

(65) Prior Publication Data
US 2020/0060288 A1  Feb. 27, 2020

Related U.S. Application Data

(60) Provisional application No. 62/462,991, filed on Feb. 24, 2017.

(51) Int. Cl.
*A01N 65/03* (2009.01)
(52) U.S. Cl.
CPC .................................... *A01N 65/03* (2013.01)

(58) Field of Classification Search
None
See application file for complete search history.

(56) References Cited

U.S. PATENT DOCUMENTS 6,387,847 B1  5/2002  Yvin

FOREIGN PATENT DOCUMENTS

| CN | 101006760 A | * | 8/2007 | |
| EP | 3066925 | | 9/2016 | |
| EP | 3066925 A1 | * | 9/2016 | ............. A01N 65/03 |

OTHER PUBLICATIONS

Abe, et al, "Chemical Races in the Red Alga *Laurencia nipponica* (Rhodomelaceae, Cermiales)", Phycologial Research, Jan. 1, 1999, pp. 87-95.
Stadnick, et al, "Algal Polysaccharides as Souce of Plant Resistance Inducers", Trocial Plant Pathology, Apr. 1, 2014, pp. 111-118.

* cited by examiner

*Primary Examiner* — Alton N Pryor
(74) *Attorney, Agent, or Firm* — Heliae Development. LLC; Adam Lunceford; Veronica-Adele R. Cao

(57) ABSTRACT

One or more compositions and methods for applying compositions, for improving characteristics of plants and soil are disclosed. The methods can be utilized by administering an effective amount of a macroalgal based composition (e.g., algal composition), such as comprising an extract of the biomass of an algae. Low concentration of the composition may be used for the application, to provide effective results.

20 Claims, 7 Drawing Sheets

LAMINARIA BASED COMPOSITIONS FOR BENEFITTING PLANTS AND METHODS OF APPLICATION

CROSS-REFERENCE TO RELATED APPLICATIONS

This application claims priority to PCT Application No. PCT/US18/19345 titled "*Laminaria* Based Compositions for Benefitting Plants and Methods of Application," which was filed on Feb. 23, 2018 in the name of the Applicant and which is a continuation of and claims the benefit of U.S. Provisional Application Ser. No. 62/462,991 filed on Feb. 24, 2017 and titled *Laminaria* Based Compositions for Benefitting Plants and Methods of Application. The entirety of both applications is incorporated herein by reference.

BACKGROUND

Seed emergence occurs as an immature plant breaks out of its seed coat, typically followed by the rising of a stem out of the soil. The first leaves that appear on many seedlings are the so-called seed leaves, or cotyledons, which often bear little resemblance to the later leaves. Shortly after the first true leaves, which are more or less typical of the plant, appear, the cotyledons will drop off. Germination of seeds is a complex physiological process triggered by imbibition of water after possible dormancy mechanisms have been released by appropriate triggers. Under favorable conditions, rapid expansion growth of the embryo culminates in rupture of the covering layers and emergence of the radicle. A number of agents have been proposed as modulators of seed emergence. Temperature and moisture modulation are common methods of affecting seed emergence. Addition of nutrients to the soil has also been used to promote emergence of seeds, and/or germination rates of certain plants. Because the growing environment can affect a plant's health and production, and the addition of nutrients to the soil or application to the foliage has been proposed to promote yield and quality in certain plants.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

Compositions and methods are described herein that can be used for improving at least one plant characteristic. In one implementation, a composition can comprise biomass and other extracts from macroalgae, such as from the genus *Laminaria*. The composition can comprise *Laminaria* derived products as an active ingredient, or a *Laminaria* derived product combined with other active ingredients such as, but not limited to, extracts from other macroalgae, extracts from microalgae, and other microalgae cultured phototrophically, mixotrophically, or heterotrophically. The compositions can be in liquid or dry form (e.g., powder, or the like). In some implementations, the compositions can be stabilized through the addition of stabilizers suitable for plants, pasteurization, and combinations thereof. In some implementations, the methods can include applying the compositions to plants or seeds in a variety of ways, such as but not limited to, soil application, foliar application, seed treatments (e.g., such as seed coating), and/or hydroponic application. In some implementations, the methods can include single, multiple, or continuous applications of the compositions, and may also comprise low concentrations of *Laminaria* extracts or biomass.

To the accomplishment of the foregoing and related ends, the following description and annexed drawings set forth certain illustrative aspects and implementations. These are indicative of but a few of the various ways in which one or more aspects may be employed. Other aspects, advantages and novel features of the disclosure will become apparent from the following detailed description when considered in conjunction with the annexed drawings.

BRIEF DESCRIPTION OF THE DRAWINGS

The methods and systems described herein may take physical form in certain parts and arrangements of parts, a preferred embodiment of which will be described in detail in the specification and illustrated in the accompanying drawings which form a part hereof, and wherein.

DETAILED DESCRIPTION

Figure 1:
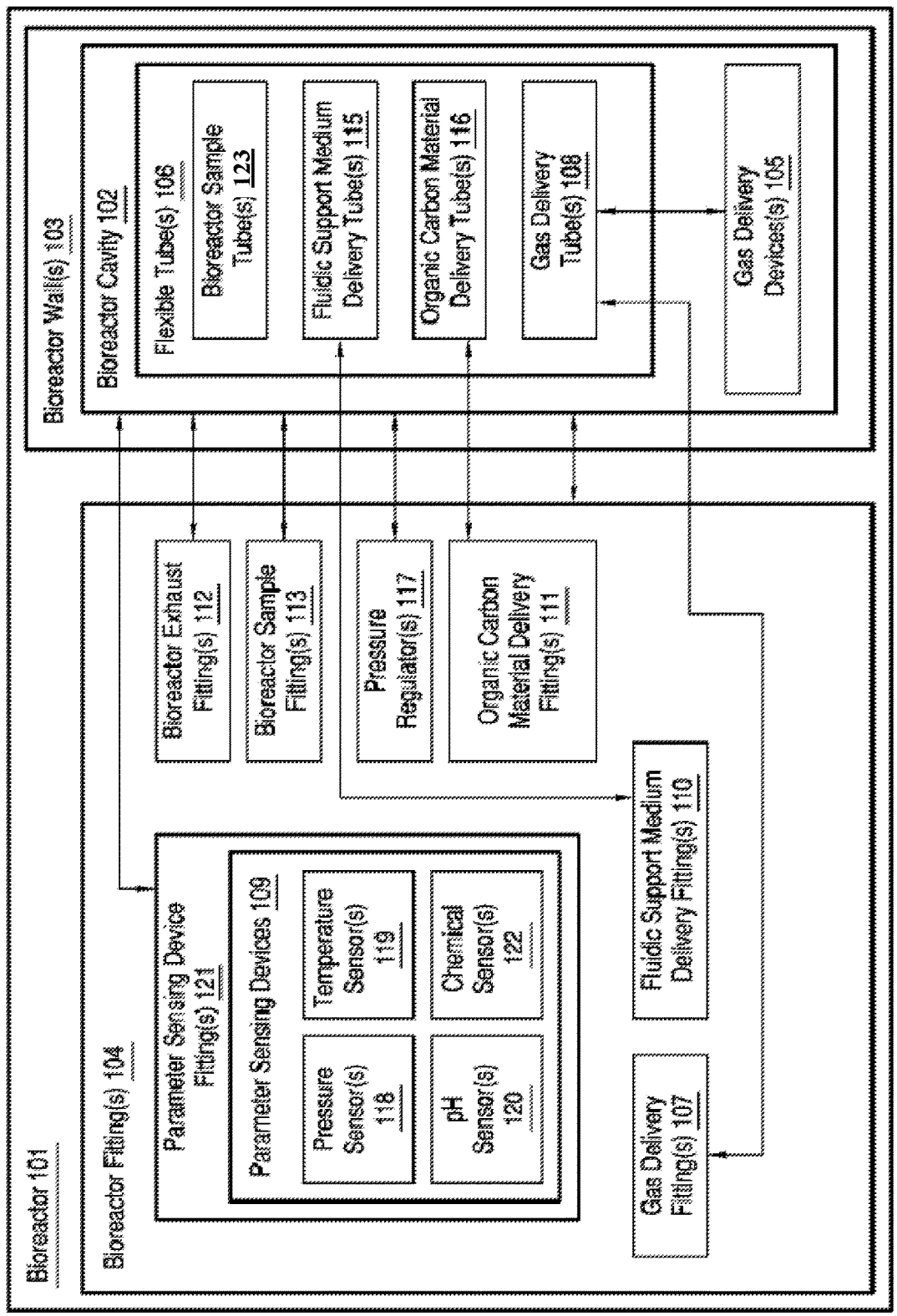
FIG. 1 illustrates an exemplary block diagram of a system, according to an embodiment.

The claimed subject matter is now described with reference to the drawings, wherein like reference numerals are generally used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

With reference to the drawings, like reference numerals designate identical or corresponding parts throughout the several views. However, the inclusion of like elements in different views does not mean a given embodiment necessarily includes such elements or that all embodiments of the inventive concepts disclosed include such elements. The examples and figures are illustrative only and not meant to limit the inventive concept, which is measured by the scope and spirit of the claims.

FIG. 1 illustrates an exemplary block diagram of a system 100, according to an embodiment. System 100 is merely exemplary and is not limited to the embodiments presented herein. System 100 can be employed in many different embodiments or examples not specifically depicted or described herein and such adjustments or changes can be selected by one or ordinary skill in the art without departing from the scope of the subject innovation.

System 100 comprises a bioreactor 101 that includes a bioreactor cavity 102 and one or more bioreactor walls 103. Further, bioreactor 101 can include one or more bioreactor fittings 104, one or more gas delivery devices 105, one or more flexible tubes 106, one or more parameter sensing devices 109, and/or one or more pressure regulators 117.

In many embodiments, bioreactor fitting(s) 104 can include one or more gas delivery fittings 107, one or more fluidic support medium delivery fittings 110, one or more organic carbon material delivery fittings 111, one or more bioreactor exhaust fittings 112, one or more bioreactor sample fittings 113, and/or one or more parameter sensing device fittings 121. In these or other embodiments, flexible tube(s) 106 can include one or more gas delivery tubes 108, one or more organic carbon material delivery tubes 116, one or more bioreactor sample tubes 123, and/or one or more fluidic support medium delivery tubes 115. Further, in these or other embodiments, parameter sensing device(s) 109 can include one or more pressure sensors 118, one or more temperature sensors 119, one or more pH sensors 120, and/or one or more chemical sensors 122.

Bioreactor 101 is operable to vitally support (e.g., sustain, grow, nurture, cultivate, among others) one or more organisms (e.g., one or more macroorganisms, one or more microorganisms, and the like). In these or other embodiments, the organism(s) can include one or more autotrophic organisms or one or more heterotrophic organisms. In further embodiments, the organism(s) can comprise one or more mixotrophic organisms. In many embodiments, the organism(s) can comprise one or more phototrophic organisms. In still other embodiments, the organism(s) can comprise one or more genetically modified organisms. In some embodiments, the organism(s) vitally supported by bioreactor 101 can comprise one or more organism(s) of a single type, multiple single organisms of different types, or multiple ones of one or more organisms of different types.

In many embodiments, exemplary microorganism (s) that bioreactor 101 may be implemented to vitally support can include algae (e.g., microalgae), fungi (e.g., mold), and/or cyanobacteria. For example, in many embodiments, bioreactor 101 can be implemented to vitally support multiple types of microalgae such as, but not limited to, microalgae in the classes: Eustigmatophyceae, Chlorophyceae, Prasinophyceae, Haptophyceae, Cyanidiophyceae, Prymnesiophyceae, Porphyridiophyceae, Labyrinthulomycetes, Trebouxiophyceae, Bacillariophyceae, and Cyanophyceae. The class Cyanidiophyceae includes species of Galdieria. The class Chlorophyceae includes species of *Chlorella*, Haematococcus, Scenedesmus, Chlamydomonas, and Micractinium. The class Prymnesiophyceae includes species of Isochrysis and *Pavlova*. The class Eustigmatophyceae includes species of Nannochloropsis. The class Porphyridiophyceae includes species of Porphyridium. The class Labyrinthulomycetes includes species of *Schizochytrium* and *Aurantiochytrium*. The class Prasinophyceae includes species of Tetraselmis. The class Trebouxiophyceae includes species of *Chlorella*. The class Bacillariophyceae includes species of Phaeodactylum. The class Cyanophyceae includes species of *Spirulina*. Further still, in many embodiments, bioreactor 101 can be implemented to vitally support microalgae genus and species as described herein.

Bioreactor cavity 102 can hold (e.g., contain or store) the organism(s) being vitally supported by bioreactor 101, and in many embodiments, can also contain a fluidic support medium configured to hold, and in many embodiments, submerge the organism(s) in a liquid, such as in or part of a culture medium. In many embodiments, the fluidic support medium can comprise a culture medium, and the culture medium can comprise, for example, water. The bioreactor cavity 102 can be at least partially formed and enclosed by one or more bioreactor wall(s) 103. When the bioreactor 101 is implemented with bioreactor fitting(s) 104, bioreactor fitting(s) 104 together with bioreactor wall(s) 103 can fully form and enclose bioreactor cavity 102. Further, as explained in greater detail below, bioreactor wall(s) 103 and one or more of bioreactor fitting(s) 104, as applicable, can be operable to at least partially (e.g., fully) seal the contents of bioreactor cavity 102 (e.g., the organism(s) and/or fluidic support medium) within bioreactor cavity 102. As a result, the bioreactor 101 can maintain conditions mitigating the risk of introducing foreign (e.g., unintended) and/or contaminating organisms to bioreactor cavity 102. In other words, bioreactor 101 can engender the dominance (e.g., proliferation) of certain (e.g., intended) organism(s) being vitally supported at bioreactor 102 over foreign (e g, unintended) and/or contaminating organisms. For example, bioreactor 101 can maintain substantially (e.g., absolutely) axenic conditions in the bioreactor cavity 102.

Bioreactor wall(s) 103 comprise one or more bioreactor wall materials. When bioreactor wall(s) 103 comprise multiple bioreactor walls, two or more of the bioreactor walls can comprise the same bioreactor wall material(s) and/or two or more of the bioreactor walls can comprise different bioreactor wall material(s). In many embodiments, part or all of the bioreactor wall material(s) can comprise (e.g., consist of) one or more flexible materials. In some embodiments, bioreactor 101 can comprise a bag bioreactor.

In these or other embodiments, part or all of the bioreactor wall material(s) (e.g., the flexible material(s)) can comprise one or more partially transparent (e.g., fully transparent) and/or partially translucent (e.g., fully translucent) materials, such as, for example, when bioreactor 101 comprises a photobioreactor (e.g., when the organism(s) comprise phototrophic organism(s)). For example, implementing the bioreactor wall material(s) (e.g., the flexible material(s)) with at least partially transparent or translucent materials can permit light radiation to pass through bioreactor wall(s) 103 to be used as an energy source by the organism(s) contained at bioreactor cavity 102. Still, in some embodiments, bioreactor 101 can vitally support phototrophic organisms when the bioreactor wall material(s) (e.g., the flexible material(s)) of bioreactor wall(s) 103 are opaque, such as, for example, by providing sources of light radiation internal to bioreactor cavity 102. Further, in some embodiments, part or all of the bioreactor wall material(s) (e.g., the flexible material(s)) can comprise one or more selectively partially transparent (e.g., fully transparent) and/or partially translucent (e.g., fully translucent) materials, able to shift from opaque to at least partial transparency (e.g., full transparency) or at least partial translucency (e.g., full translucency).

Bioreactor cavity 102 can comprise a cavity volume. The cavity volume of bioreactor cavity 102 can comprise any desirable volume. However, in some embodiments, the cavity volume can be constrained by an available geometry (e.g., the dimensions) of the sheet material(s) used to manufacture bioreactor wall(s) 103. Other factors that can constrain the cavity volume can include a light penetration depth through bioreactor wall(s) 103 and into bioreactor cavity 102 (e.g., when the organism(s) vitally supported by bioreactor 101 are phototrophic organism(s)), a size of an available autoclave for sterilizing bioreactor 101, and/or a size of a support structure implemented to mechanically support bioreactor 101. For example, the support structure can be similar or identical to support structure 323 (shown in FIG. 3) and/or support structure 423 (as shown in FIG. 4).

Figure 2:
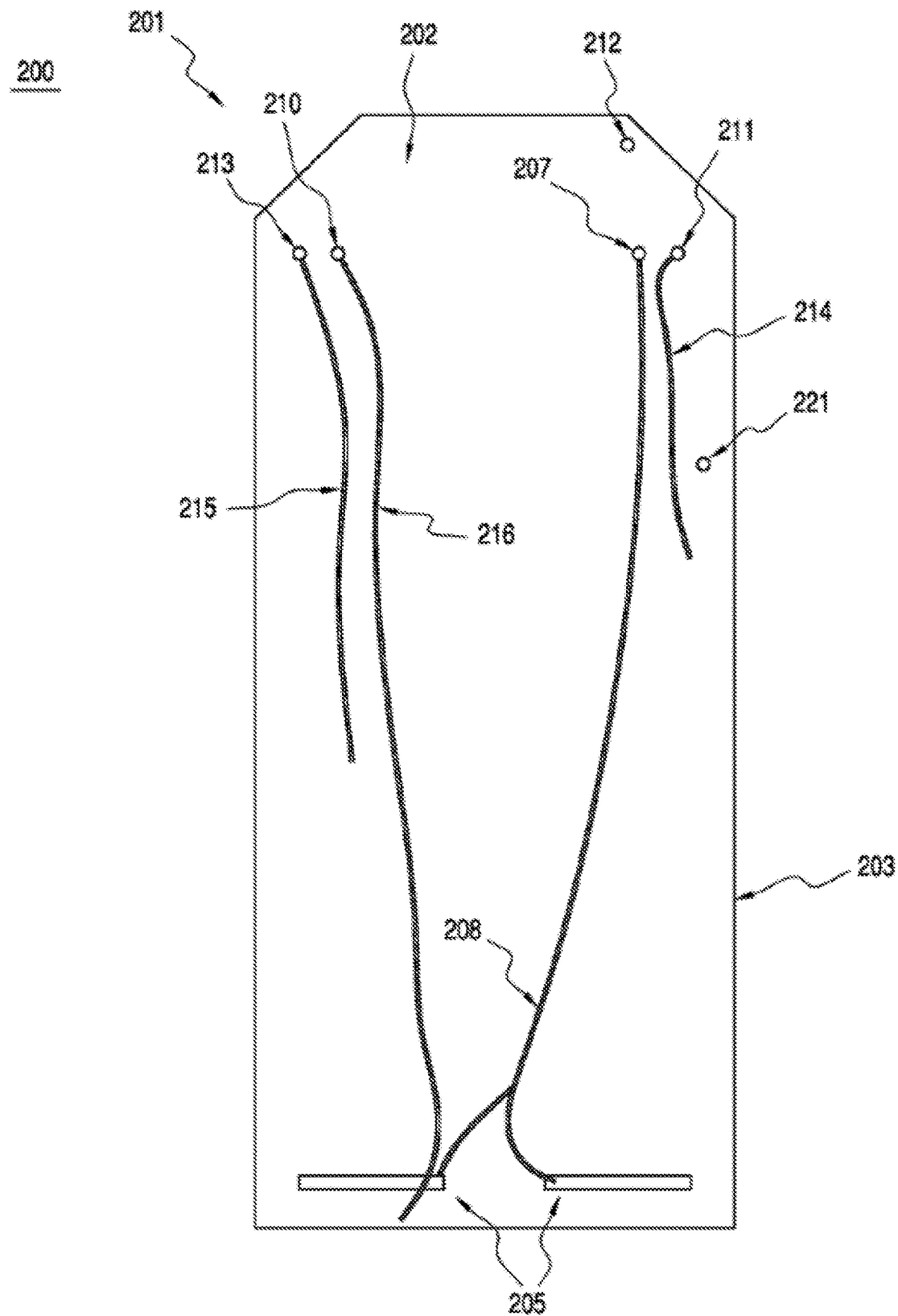
FIG. 2 illustrates a schematic side view of a system, according to an embodiment.

FIG. 2 illustrates a schematic side view of a system 200, according to an embodiment. System 200 is a non-limiting example of system 100 (as shown in FIG. 1). Yet, system 200 of FIG. 2 can be modified or substantially similar to the system 100 of FIG. 1 and such modifications can be selected by one of ordinary skill in the art without departing from the scope of this innovation.

System 200 can comprise bioreactor 201, bioreactor cavity 202, one or more bioreactor walls 203, one or more gas delivery devices 205, one or more gas delivery fittings 207, one or more gas delivery tubes 208, one or more fluidic support medium delivery fittings 210, one or more organic carbon material delivery fittings 211, one or more bioreactor exhaust fittings 212, one or more bioreactor sample fittings 213, one or more organic carbon material delivery tubes 214, one or more bioreactor sample tubes 215, one or more fluidic support medium delivery tubes 216, and one or more parameter sensing device fittings 221. In some embodiments, bioreactor 201 can be similar or identical to bioreactor 101 (as shown in FIG. 1); bioreactor cavity 202 can be similar or identical to bioreactor cavity 102 (as shown in FIG. 1); bioreactor wall(s) 203 can be similar or identical to bioreactor wall(s) 103 (as shown in FIG. 1); gas delivery device(s) 205 can be similar or identical to gas delivery device(s) 105 (as shown in FIG. 1); gas delivery fitting(s) 207 can be similar or identical to gas delivery fitting(s) 107 (as shown in FIG. 1); gas delivery tube(s) 208 can be similar or identical to gas delivery tube(s) 108 (as shown in FIG. 1); fluidic support medium delivery fitting(s) 210 can be similar or identical to fluidic support medium delivery fitting(s) 110 (as shown in FIG. 1); organic carbon material delivery fitting(s) 211 can be similar or identical to organic carbon material delivery fitting(s) 111 (as shown in FIG. 1); bioreactor exhaust fitting(s) 212 can be similar or identical to bioreactor exhaust fitting(s) 112 (as shown in FIG. 1); bioreactor sample fitting(s) 213 can be similar or identical to bioreactor sample fitting(s) 113 (as shown in FIG. 1); organic carbon material delivery tube(s) 214 can be similar or identical to organic carbon material delivery tube(s) 116 (as shown in FIG. 1); bioreactor sample tube(s) 215 can be similar or identical to bioreactor sample tube(s) 123 (as shown in FIG. 1); fluidic support medium delivery tube(s) 216 can be similar or identical to fluidic support medium delivery tube(s) 115 (as shown in FIG. 1); and/or parameter sensing device fitting(s) 221 can be similar or identical to parameter sensing device fitting(s) 121 (as shown in FIG. 1).

Figure 3:
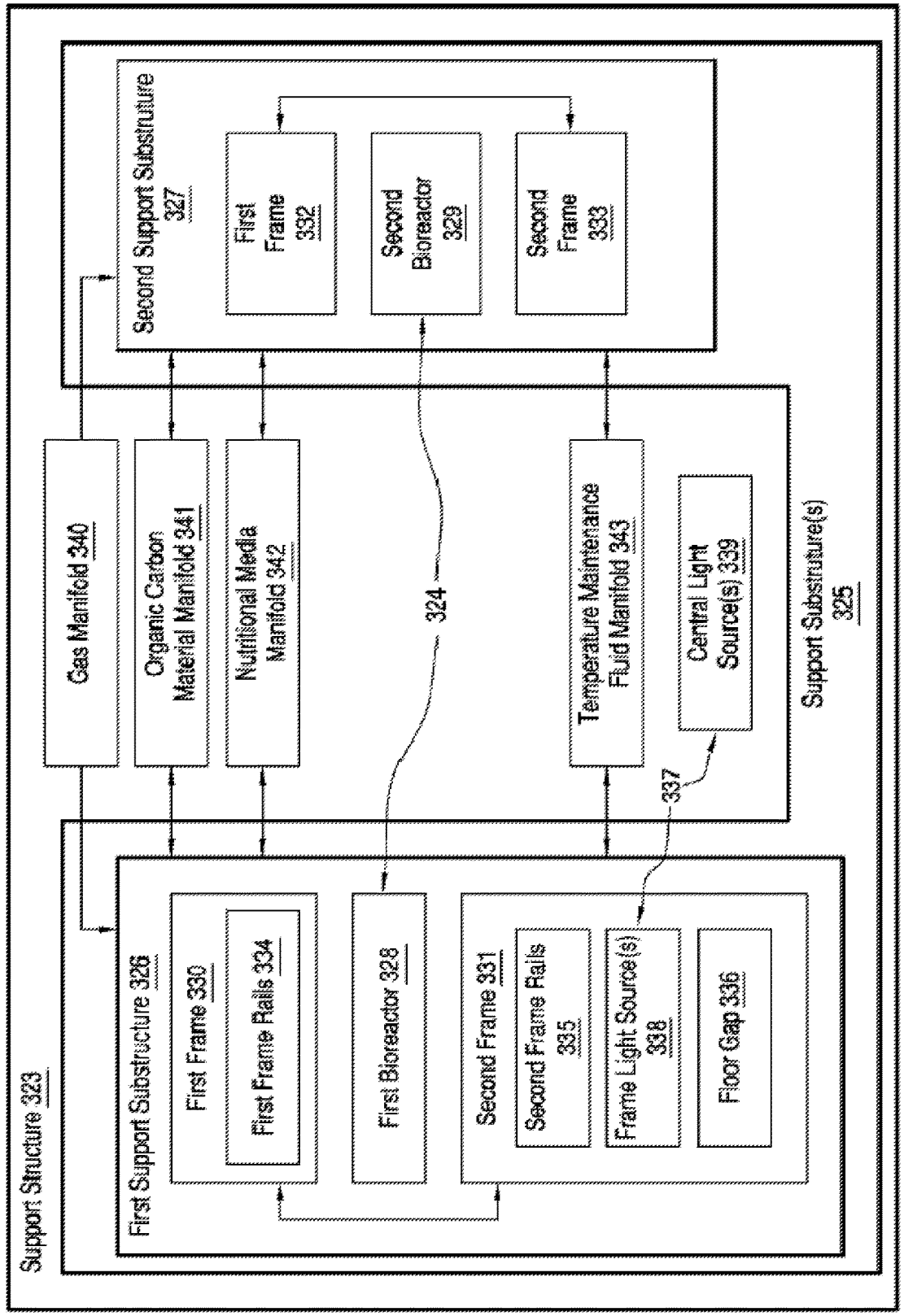
FIG. 3 illustrates an exemplary block diagram of a system, according to an embodiment.
Figure 4:
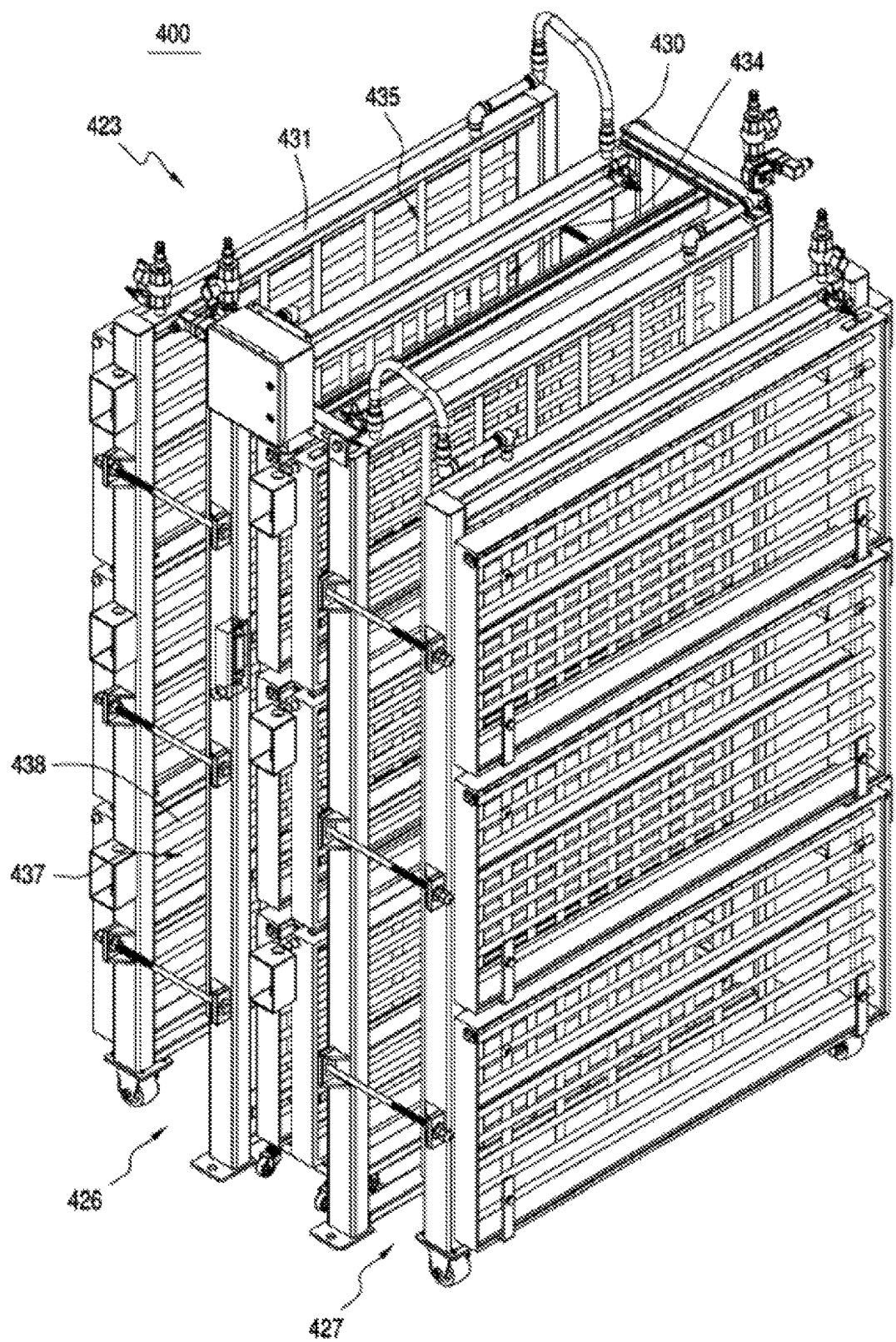
FIG. 4 illustrates a system, according to an embodiment.

Turning ahead now in the drawings, FIG. 3 illustrates an exemplary block diagram of a system 300, according to an embodiment. System 300 is merely exemplary and is not limited to the embodiments presented herein. System 300 can be employed in many different embodiments or examples not specifically depicted or described herein.

System 300 comprises a support structure 323. As explained in greater detail below, support structure 323 is operable to mechanically support one or more bioreactors 324. In these or other embodiments, as also explained in greater detail below, support structure 323 can be operable to maintain a set point temperature of one or more of bioreactor(s) 324. In many embodiments, one or more of bioreactor(s) 324 can be similar or identical to bioreactor 101 (as shown in FIG. 1) and/or bioreactor 201 (as shown in FIG. 2). Accordingly, the term "set point temperature" can refer to the set point temperature as defined above with respect to system 100 (as shown in FIG. 1). Further, when bioreactor(s) 324 comprise multiple bioreactors, two or more of bioreactor(s) 324 can be similar or identical to each other and/or two or more of bioreactor(s) 324 can be different form each other. For example, the bioreactor wall materials of the bioreactor walls of two or more of bioreactor(s) 324 can be different. In some embodiments, system 300 can comprise one or more of bioreactor(s) 324.

In many embodiments, support structure 323 comprises one or more support substructures 325. Each support substructure of support substructure(s) 325 can mechanically support one bioreactor or more bioreactor(s) 324. In these or other embodiments, each support substructure of support substructure(s) 325 can maintain a set point temperature of one bioreactor of bioreactor(s) 324. In further embodiments, each of support substructure(s) 325 can be similar or identical to each other.

For example, support substructure(s) 325 can comprise a first support substructure 326 and a second support substructure 327. In these embodiments, first support substructure 326 can mechanically support a first bioreactor 328 of bioreactor(s) 324, and second support substructure 327 can mechanically support a second bioreactor 329 of bioreactor(s) 324. Further, first support substructure 326 can comprise a first frame 330 and a second frame 331, and second support substructure 327 can comprise a first frame 332 and a second frame 333. In many embodiments, first frame 330 can be similar or identical to first frame 332, and second frame 331 can be similar or identical to second frame 333. Further, first frame 330 can be similar to second frame 331, and first frame 332 can be similar to second frame 333. It is to be appreciated that the first support substructure 326 can include one or more frames of a first material and the second support substructure 327 can include one or more frames of a second material.

As indicated above, first support substructure 326 can be similar or identical to second support substructure 327. Accordingly, to increase the clarity of the description of system 300 generally, the description of second support substructure 327 is limited so as not to be redundant with respect to first support substructure 326.

In many embodiments, first frame 330 and second frame 331 together can mechanically support first bioreactor 328 in interposition between first frame 330 and second frame 331. That is, bioreactor 328 can be sandwiched between first frame 330 and second frame 331 at a slot formed between first frame 330 and second frame 331. In these or other embodiments, first frame 330 and second frame 331 together can mechanically support first bioreactor 328 in an approximately vertical orientation. Further, first frame 330 and second frame 331 can be oriented approximately parallel to each other. In another embodiment, the first frame 330 and the second frame 331 can be perpendicular to one another.

In many embodiments, second frame 331 can be selectively moveable relative to first frame 330 so that the volume of the slot formed between first frame 330 and second frame 331 can be adjusted. For example, second frame 331 can be supported by one or more wheels permitting second frame 331 to be rolled closer to or further from first frame 330. Meanwhile, in these or other embodiments, second frame 331 can be coupled to first frame 330 by one or more adjustable coupling mechanisms. The adjustable coupling mechanism(s) can hold second frame 331 in a desired position relative to first frame 330 while being adjustable so that the position can be changed when desirable. In implementation, the adjustable coupling mechanism (s) can comprise one or more threaded screws extending between first frame 330 and second frame 331, such as, for example, in a direction orthogonal to first frame 330 and second frame 331. Turning the threaded screws can cause second frame 331 to move (e.g., on the wheel(s)) relative to first frame 330.

Meanwhile, in some embodiments, first frame 330 can be operable to maintain a set point temperature of first bioreactor 328 when first bioreactor 328 is operating to vitally support one or more organisms and when support structure 300 (e.g., first support substructure 326, first frame 330, and/or second frame 331) is mechanically supporting first bioreactor 328. In these or other embodiments, second frame 331 can be operable to maintain the set point temperature of first bioreactor 328 when first bioreactor 328 is operating to vitally support the organism(s) and when support structure 300 (e.g., second support substructure 327, first frame 330, and/or second frame 331) is mechanically supporting first bioreactor 328.

As indicated above, in many embodiments, second frame 331 can be similar or identical to first frame 330. Accordingly, second frame 331 can comprise multiple second frame rails 335. Meanwhile, second frame rails 335 can be similar or identical to first frame rails 334. In some embodiments, the hollow conduits of first frame rails 334 can be coupled to hollow conduits of 335. In these embodiments, the hollow conduits of first frame rails 334 and second frame rails 335 can receive the temperature maintenance fluid from the same source. However, in these or other embodiments, the hollow conduits of first frame rails 334 and the hollow conduits of second frame rails 335 can receive the temperature maintenance fluid from different sources.

In many embodiments, first support substructure 326 comprises a floor gap 336. Floor gap 336 can be located underneath one of first frame 330 or second frame 331. Floor gap 336 can permit first bioreactor 328 to bulge into floor gap 336 past first support substructure 326 when first support substructure 326 is mechanically supporting first bioreactor 328. Permitting first bioreactor 328 to bulge into floor gap 336 can relieve stress from first bioreactor 328. For example, in many embodiments, bioreactor(s) 324 can experience the greatest amount of stress at their base(s) when being mechanically supported in a vertical position, such as, for example, by support structure 323. In these embodiments, permitting first bioreactor 328 to bulge into floor gap 336 such that first support substructure 326 is not restraining first bioreactor 328 at floor gap 336 can relieve more stress from first bioreactor 328 than constraining all of first bioreactor 328 at both sides with first frame 330 and second frame 331, even if first frame 330 and second frame 331 are reinforced.

System 300 (e.g., support structure 323) can comprise one or more light sources 337. Light source(s) 337 can be operable to illuminate the organism(s) being vitally supported at bioreactor(s) 324. In many embodiments, second frame 331 can comprise and/or mechanically support one or more frame light source(s) 338 of light source(s) 337. Meanwhile, system 300 (e.g., support structure 323) can comprise one or more central light source(s) 339. In these or other embodiments, support substructure(s) 325 (e.g., first support substructure 326 and second support substructure 327) can be mirrored about a central vertical plane of support structure 323. Accordingly, central light source(s) 339 can be interpositioned between first support substructure 326 and second support substructure 327 so that first bioreactor 328 and second bioreactor 329 each can receive light from central light source(s) 339.

In implementation, light source(s) 337 (e.g., frame light source(s) 338 and/or central light source(s) 339) can comprise one or more banks of light bulbs and/or light emitting diodes. In some embodiments, light source(s) 337 (e.g., the light bulbs and/or light emitting diodes) can emit one or more wavelengths of light, as desirable for the particular organism(s) being vitally supported by bioreactor(s) 324.

In some embodiments, the one or more light sources 337 may be provided on one side of the bioreactors 324, and a second side of the bioreactors 324 may have no lighting devices or may have the panels with light sources pivoted open. In one non-limiting exemplary embodiment, a system 300 can include light sources 337 on a first side and an open second side to gather natural light.

Advantageously, because each support substructure of support substructure(s) 325 can maintain a set point temperature of different ones of bioreactor(s) 324, each of bioreactor(s) 324 can be maintained at a set point temperature independently of each other. For example, when bioreactor(s) 324 are vitally supporting different types of organism(s), bioreactor(s) 324 can comprise different set point temperatures. Nonetheless, in many embodiments, bioreactor(s) 324 can comprise the same set point temperatures.

Meanwhile, in many embodiments, system 300 can comprise gas manifold 340, organic carbon material manifold 341, nutritional media manifold 342, and/or temperature maintenance fluid manifold 343. Gas manifold 340 can be operable to provide gas to one or more gas delivery fittings of bioreactor(s) 324. The gas delivery fitting(s) can be similar or identical to gas delivery fitting(s) 107 (as shown in FIG. 1) and/or gas delivery fitting(s) 207 (as shown in FIG. 2). Further, organic carbon material manifold 341 can be operable to deliver organic carbon material to one or more organic carbon material delivery fittings of bioreactor(s) 324. The organic carbon material delivery fitting(s) can be similar or identical to organic carbon material delivery fitting(s) 111 (as shown in FIG. 1) and/or organic carbon material delivery fitting(s) 211 (as shown in FIG. 2). Further still, nutritional media manifold 342 can be operable to provide nutritional media to one or more fluidic support medium delivery fittings of bioreactor(s) 324. The fluidic support medium delivery fitting(s) can be similar or identical to fluidic support medium delivery fitting(s) 110 (as shown in FIG. 1) and/or fluidic support medium delivery fitting(s) 210 (as shown in FIG. 2). Meanwhile, temperature maintenance fluid manifold can be configured to provide the temperature maintenance fluid to the hollow conduits of first frame 330 and/or second frame 331.

Gas manifold 340, organic carbon material manifold 341, nutritional media manifold 342, and/or temperature maintenance fluid manifold 343 each can comprise one or more tubes, one or more valves, one or more gaskets, one or more reservoirs, one or more pumps, and/or control logic (e.g., one or more computer processors, one or more transitory memory storage modules, and/or one or more non-transitory memory storage modules) configured to perform their respective functions. In these embodiments, the control logic can communicate with one or more parameter sensing devices of bioreactor(s) 324 to determine when to perform their respective functions (e.g., according to the needs of the organism(s) being vitally supported by bioreactor(s) 324). The parameter sensing device(s) can be similar or identical to parameter sensing device(s) 109 (as shown in FIG. 1).

Turning to the next drawing, FIG. 4 illustrates a system 400, according to an embodiment. System 400 is a non-limiting example of system 300 (as shown in FIG. 3). Yet, system 400 of FIG. 4 can be modified or substantially similar to the system 300 of FIG. 3 and such modifications can be selected by one or ordinary skill in the art without departing from the scope of this innovation.

System 400 can comprise support structure 423, first support substructure 426, second support substructure 427, first frame 430, second frame 431, first frame rails 434, second frame rails 435, and one or more light source(s) 437. In these embodiments, light source(s) 437 can comprise one or more frame light sources 438. In many embodiments, support structure 423 can be similar or identical to support structure 323 (as shown in FIG. 3); first support substructure 426 can be similar or identical to first support substructure 326 (as shown in FIG. 3); second support substructure 427 can be similar or identical to second support substructure 327 (as shown in FIG. 3); first frame 430 can be similar or identical to first frame 330 (as shown in FIG. 3); second frame 431 can be similar or identical to second frame 331 (as shown in FIG. 3); first frame rails 434 can be similar or identical to first frame rails 334 (as shown in FIG. 3); second frame rails 435 can be similar or identical to second frame rails 335 (as shown in FIG. 3); and/or light source(s) 437 can be similar or identical to light source(s) 337 (as shown in FIG. 3). Further, frame light source(s) 438 can be similar or identical to frame light source(s) 338.

Figure 5:
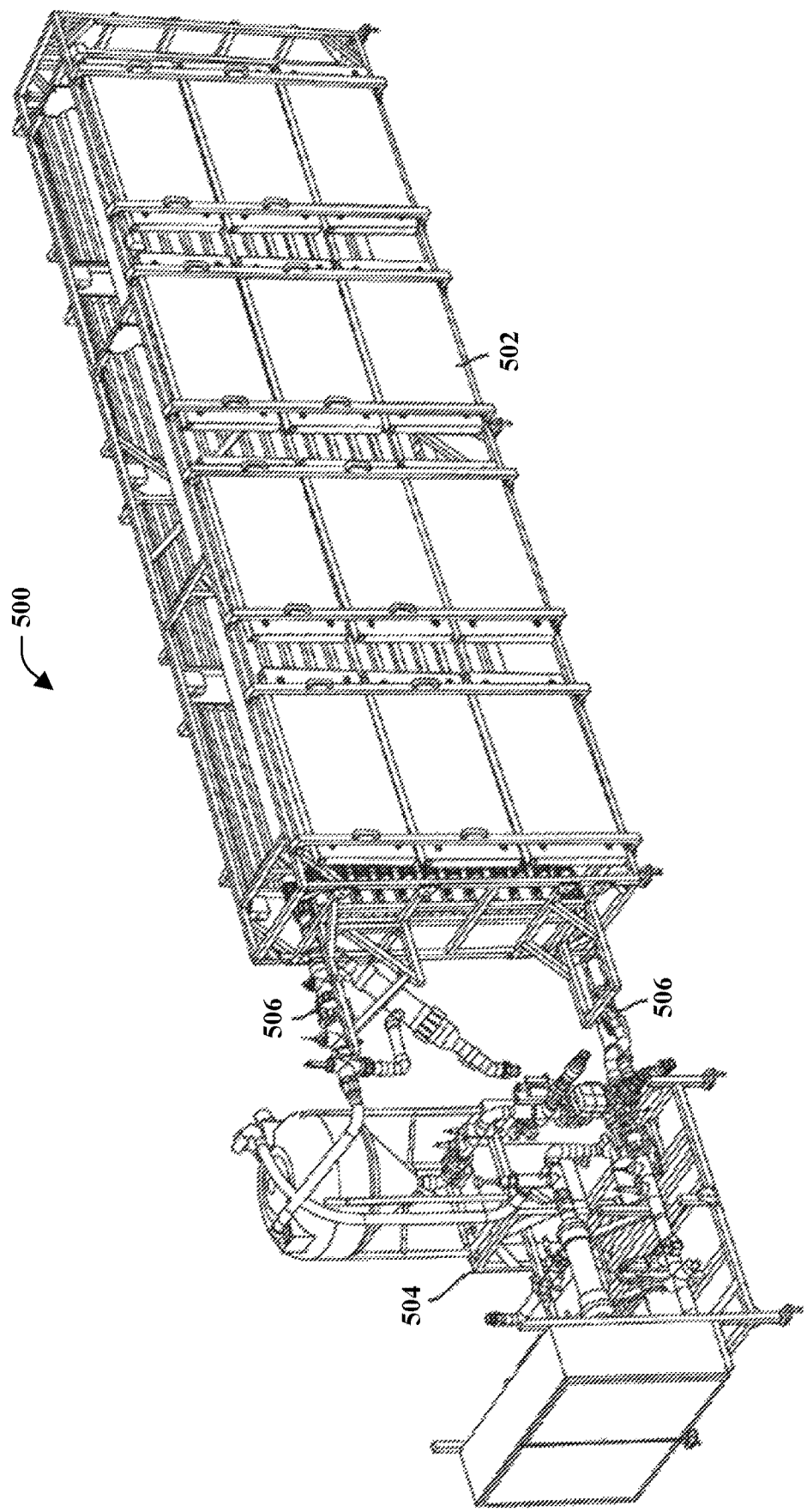
FIG. 5 illustrates a perspective view of an exemplary modular bioreactor system embodiment with modules that can be coupled and decoupled.

FIG. 5 illustrates an embodiment of a modular bioreactor system 500. In one embodiment, a self-contained bioreactor system for culturing microorganisms in an aqueous medium comprises a modular bioreactor system. The modular bioreactor system comprises a plurality of modular components which may be easily coupled together into a functioning system and decoupled for repair, replacement, upgrading, shipping, cleaning, or reconfiguration. The interchangeability of the modular components allows components of a bioreactor system to be easily transported and assembled at multiple locations, as well as to change the capacity of the bioreactor system or change the functionality of the bioreactor system. Each module is a standalone unit that may be interchanged with other modular bioreactor systems for different configurations, providing the benefit of flexibility over conventional single configuration integrated bioreactor systems.

In some embodiments, the modular components may be decoupled when the modular bioreactor system contains an aqueous culture of microorganisms, while maintaining isolated volumes of the aqueous microorganism culture in the various individual modular components without exposing the culture of microorganisms to the environment or outside contamination. With the ability to maintain an isolated volume of the aqueous culture, modules may be interchanged in the event of equipment malfunction without necessitating harvest or enduring a complete loss of the microorganism culture. Additionally, an isolated volume of the aqueous microorganism culture may be transported to different locations for different operations, such as growth, product maturation (e.g., lipid accumulation, pigment accumulation), harvest, dewatering, etc. The modular components may couple and decouple from each other using pipe or tubular quick connect couplers which may be quickly coupled by hand to allow fluid communication between modular components and quickly decoupled in a manner which also self-seals any fluid communication, effectively sealing an isolated volume of the aqueous culture in each modular component. The quick connect couplers may comprise fluid conduit couplers known in the art such as, but not limited to, cam lock couplers.

A non-limiting exemplary embodiment of a modular bioreactor system 500 is shown in FIG. 5. FIG. 5 shows a modular bioreactor system 500 with a bioreactor module 502, cleaning module 504, and pump and control module 506 coupled together in fluid communication. It is to be appreciated that the modular bioreactor system 500 with a bioreactor module 502, cleaning module 504, and pump and control module 506 can be decoupled from each other. As an example, one or more couplers between the modules may comprise quick connection couplers such as, but not limited to, cam lock couplers, capable of self-sealing an isolated volume of an aqueous culture medium in each individual module. In some embodiments of the modular bioreactor system 500, the couplers may comprise traditional couplers such as, but not limited to, threaded connections or bolted together flange connections.

Figure 6:
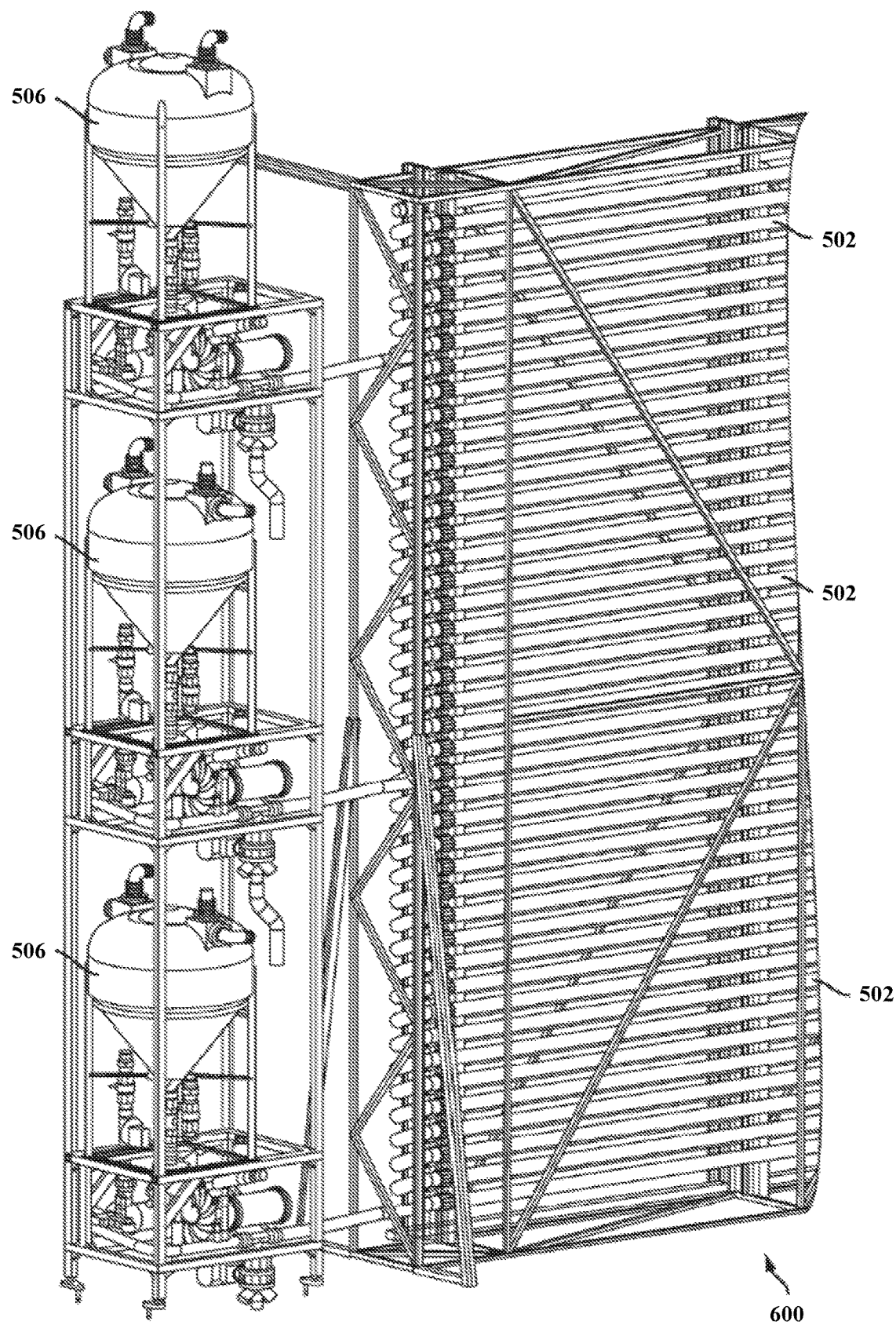
FIG. 6 illustrates a perspective view of an exemplary cascading transfer bioreactor system embodiment.

FIG. 6 illustrates a non-limiting exemplary embodiment of a cascading transfer bioreactor system 600 with multiple bioreactor modules 502 and multiple pump and control modules 506. The cascading transfer bioreactor system 600 can include modular bioreactors may be used as a production platform, as a seed reactor platform, or a combination of both. The cascading transfer bioreactor system 600 may be used in a system that connects the seed production with one or more large volume downstream production reactors. The cascading transfer bioreactor system 600 may be partially or fully harvested to inoculate a larger seed reactor. The cascading transfer bioreactor system 600 may be used as a finishing step for the production of products that require a two-step growth process to produce pigments or other high value products.

In an alternate embodiment, the cascading transfer bioreactor system 600 may comprise culture tube segments that have different diameters, where a small diameter is used for a preferentially phototrophic section while a larger tubular diameter is used for a preferably mixotrophic section. The segments with different culture tube diameters may be interleaved and connected in a way to enhance turbulence or mixing in the system without the use of a high Reynolds numbers such that the overall system pressure drop is reduced.

Figure 7:
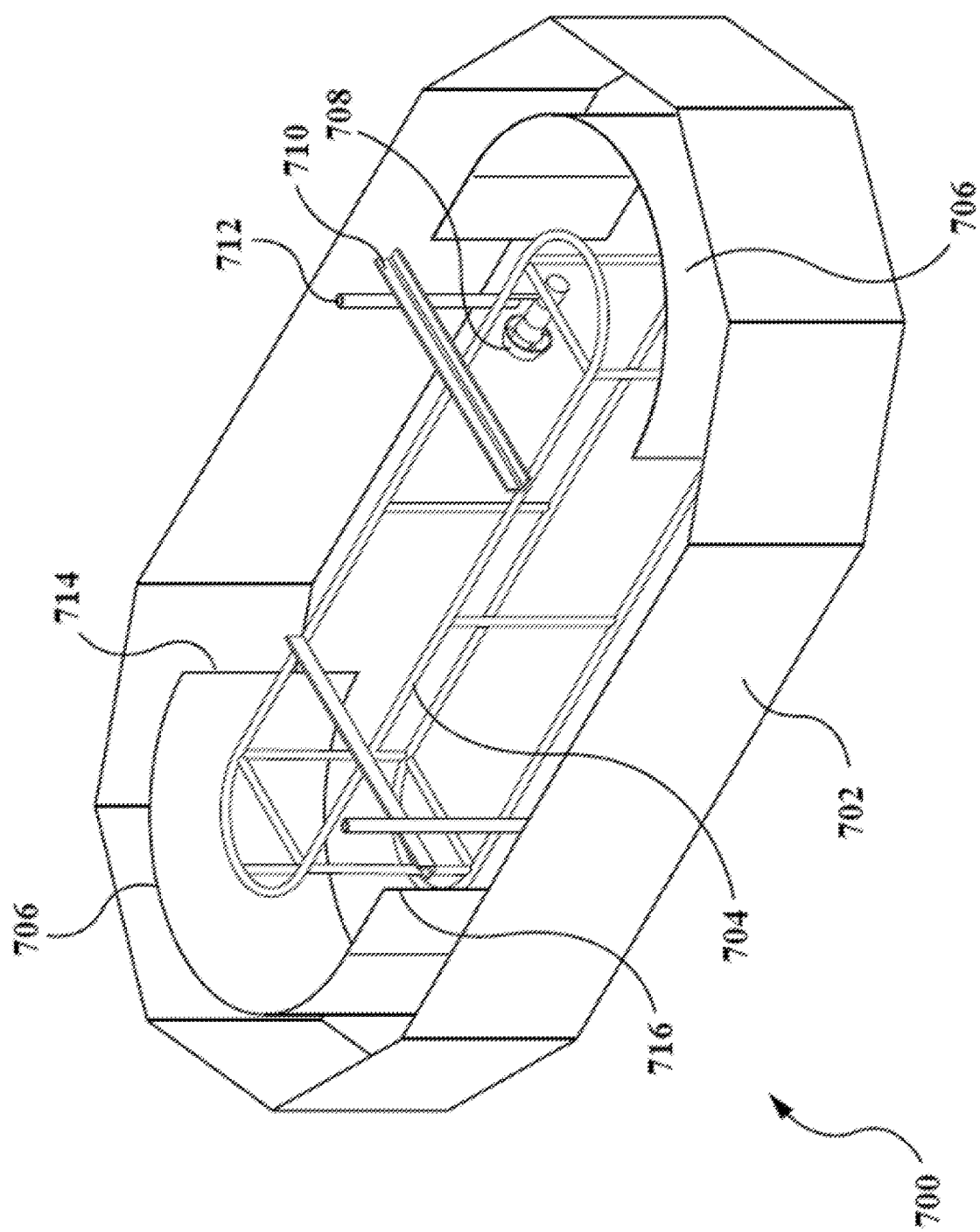
FIG. 7 illustrates a perspective view of an open raceway pond bioreactor embodiment with turning vanes and thrusters.

Turning to FIG. 7, a non-limiting embodiment of the open raceway pond bioreactor 700 is illustrated. The open raceway pond bioreactor 700 comprises an outer wall 702, center wall 704, arched turning vanes 706, submerged thrusters 708, support structure 710 (horizontal), and 712 (vertical). The outer wall 702 and the center wall 704 form the boundaries of the straight away portions and U-bend portions of the bioreactor 700. The center wall 704 is shown as a frame for viewing purposes, but in practice panels are inserted into open sections of the frame or a liner placed over the frame to form a solid center wall surface. Also, the outer wall 702 of the bioreactor 700 is depicted as multiple straight segments connected at angles to form the curved portion of the U-bend, but the outer wall 702 may also form a continuous curve or arc.

The arched turning vanes 706 can have an asymmetrical shape having a first end 714 of the turning vane at the beginning of the U-bend portion and a second end 716 extending past the U-bend portion into the straight away portion. The flow path of the culture in the open raceway pond bioreactor 700 would be counter clockwise, with the culture encountering first end 714 of the turning vane first, second end 716 of the turning vane second, and then the submerged thruster 708 when traveling through the U-bend portion and into the straight away portion. The arched turning vanes 706 are also shown in to be at least as tall as the center wall 704, to allow a portion of the arched turning vanes 706 to protrude from the culture volume when operating.

Many plants may benefit from the application of liquid compositions that provide a bio-stimulatory effect. Non-limiting examples of plant families that can benefit from such compositions can comprise: Solanaceae, Fabaceae (Leguminosae), Poaceae, Roasaceae, Vitaceae, Brassicaeae (Cruciferae), Caricaceae, Malvaceae, Sapindaceae, Anacardiaceae, Rutaceae, Moraceae, Convolvulaceae, Lamiaceae, Verbenaceae, Pedaliaceae, Asteraceae (Compositae), Apiaceae (Umbelliferae), Araliaceae, Oleaceae, Ericaceae, Actinidaceae, Cactaceae, Chenopodiaceae, Polygonaceae, Theaceae, Lecythidaceae, Rubiaceae, Papveraceae, Illiciaceae Grossulariaceae, Myrtaceae, Juglandaceae, Bertulaceae, Cucurbitaceae, Asparagaceae (Liliaceae), Alliaceae (Liliceae), Bromeliaceae, Zingieraceae, Muscaceae, Areaceae, Dioscoreaceae, Myristicaceae, Annonaceae, Euphorbiaceae, Lauraceae, Piperaceae, and Proteaceae.

The Solanaceae plant family includes a large number of agricultural crops, medicinal plants, spices, and ornamentals in its, over 2,500 species. Taxonomically classified in the Plantae kingdom, Tracheobionta (subkingdom), Spermatophyta (superdivision), Magnoliophyta (division), Manoliopsida (class), Asteridae (subclass), and Solanales (order), the Solanaceae family includes, but is not limited to, potatoes, tomatoes, eggplants, various peppers, tobacco, and petunias. Plants in the Solanaceae can be found on all the continents, excluding Antarctica, and thus have a widespread importance in agriculture across the globe.

The Fabaceae plant family (also known as the Leguminosae) comprises the third largest plant family with over 18,000 species, including a number of important agricultural and food plants. Taxonomically classified in the Plantae kingdom, Tracheobionta (subkingdom), Spermatophyta (superdivision), Magnoliophyta (division), Manoliopsida (class), Rosidae (subclass), and Fabales (order), the Fabaceae family includes, but is not limited to, soybeans, beans, green beans, peas, chickpeas, alfalfa, peanuts, sweet peas, carob, and liquorice. Plants in the Fabaceae family can range in size and type, including but not limited to, trees, small annual herbs, shrubs, and vines, and typically develop legumes. Plants in the Fabaceae family can be found on all the continents, excluding Antarctica, and thus have a widespread importance in agriculture across the globe. Besides food, plants in the Fabaceae family can be used to produce natural gums, dyes, and ornamentals.

The Poaceae plant family supplies food, building materials, and feedstock for fuel processing. Taxonomically classified in the Plantae kingdom, Tracheobionta (subkingdom), Spermatophyta (superdivision), Magnoliophyta (division), Liliopsida (class), Commelinidae (subclass), and Cyperales (order), the Poaceae family includes, but is not limited to, flowering plants, grasses, and cereal crops such as barely, corn, lemongrass, millet, oat, rye, rice, wheat, sugarcane, and sorghum. Types of turf grass found in Arizona include, but are not limited to, hybrid Bermuda grasses (e.g., 328 tifgrn, 419 tifway, tif sport).

The Rosaceae plant family includes flowering plants, herbs, shrubs, and trees. Taxonomically classified in the Plantae kingdom, Tracheobionta (subkingdom), Spermatophyta (superdivision), Magnoliophyta (division), Magnoliopsida (class), Rosidae (subclass), and Rosales (order), the Rosaceae family includes, but is not limited to, almond, apple, apricot, blackberry, cherry, nectarine, peach, plum, raspberry, strawberry, and quince.

The Vitaceae plant family includes flowering plants and vines. Taxonomically classified in the Plantae kingdom, Tracheobionta (subkingdom), Spermatophyta (superdivision), Magnoliophyta (division), Magnoliopsida (class), Rosidae (subclass), and Rhammales (order), the Vitaceae family includes, but is not limited to, grapes.

Improvement in production of fruit from plants can be obtained in attention from early stages of growth, such as when the plant emerges and matures. A method can be devised for treating a seed, seedling, or plant to improve the germination, emergence, and maturation of the plant; or to enhance the microbial soil community surrounding the seed or seedling. Assessing emergence of a plant is performed at the hypocotyl stage, where a stem is visibly protruding from the soil. Assessing maturation of the plant is the performed at the cotyledon stage, where one or two leaves visibly form on the emerged stem.

Production of fruit from plants can be assessed by the yield and quality of fruit, which may be include, but is not limited to, the number, weight, color, firmness, ripeness, moisture, degree of insect infestation, degree of disease or rot, and degree of sunburn of the fruit. A method can be devised for treating a plant to improve the characteristics of the plant, or to enhance the chlorophyll level of the plant for photosynthetic capabilities and health of the plant's leaves, roots, and shoot to enable robust production of fruit. Marketable and unmarketable designations may apply to both the plant and fruit, and may be defined differently based on the end use of the product, such as but not limited to, fresh market produce and processing for inclusion as an ingredient in a composition. The marketable determination may assess such qualities as, but not limited to, color, insect damage, blossom end rot, softness, and sunburn. The term total production may incorporate both marketable and unmarketable plants and fruit. The ratio of marketable plants or fruit to unmarketable plants or fruit may be referred to as utilization and expressed as a percentage. The utilization may be used as an indicator of the efficiency of the agricultural process as it may be an indicator of successful production of marketable plants or fruit, whereas total production may not provide comparable indicators.

To achieve such improvements in emergence, maturation, and yield of plants, a method is disclosed herein to treat such seeds and plants, and soil with a low concentration macroalgae based composition (e.g., algal composition), in a solid or liquid solution form. In some embodiments, the macroalgae can comprise species of *Laminaria*.

In some embodiments, the harvested *Laminaria* may be subjected to downstream processing and the resulting extract may be used in a dried composition (e.g., powder, pellet) or a liquid composition (e.g., suspension, solution) for application to plants, seeds, soil, or a combination thereof. Non-limiting examples of downstream processing can comprise: drying the plants, lysing the plants, and subjecting the harvested plants to a solvent or supercritical carbon dioxide extraction process to isolate an oil or protein. In some embodiments, the extracted (e.g., residual) biomass remaining from an extraction process may be used alone or in combination with other biomass or extracts in a liquid composition for application to plants, seeds, soil, or a combination thereof. By subjecting the *Laminaria* to an extraction process the resulting biomass can be transformed from a natural whole state to a lysed condition where at least some of the portions of the cell are no longer present, for example, thereby missing some of the natural components; thus differentiating the extracted *Laminaria* biomass from that which is found in nature.

In some embodiments, *Laminaria* may be the dominant active ingredient source in the composition. In some embodiments, *Laminaria* comprises at least 99% of the active ingredient sources of the composition. In some embodiments, *Laminaria* comprises at least 95% of the active ingredient sources of the composition. In some embodiments, *Laminaria* comprises at least 90% of the active ingredient sources of the composition. In some embodiments, *Laminaria* comprises at least 80% of the active ingredient sources of the composition. In some embodiments, *Laminaria* comprises at least 70% of the active ingredient sources of the composition. In some embodiments, *Laminaria* comprises at least 60% of the active ingredient sources of the composition. In some embodiments, *Laminaria* comprises at least 50% of the active ingredient sources of the composition. In some embodiments, *Laminaria* comprises at least 40% of the active ingredient sources of the composition. In some embodiments, *Laminaria* comprises at least 30% of the active ingredient sources of the composition. In some embodiments, *Laminaria* comprises at least 20% of the active ingredient sources of the composition. In some embodiments, *Laminaria* comprises at least 10% of the active ingredient sources of the composition. In some embodiments, *Laminaria* comprises at least 5% of the active ingredient sources of the composition. In some embodiments, *Laminaria* comprises at least 1% of the active ingredient sources of the composition. In some embodiments, the composition lacks detectable amounts of other active ingredient species other than *Laminaria*.

In some embodiments, *Laminaria* biomass or extracts may also be mixed with extracts from other plants, algae, microalgae, macroalgae, seaweeds, and kelp. In some embodiments, *Laminaria* biomass or extracts may also be mixed with fish oil. Non-limiting examples of algae that may be processed through extraction and combined with *Laminaria* may comprise species of *Kappaphycus, Lemna, Aschophyllum, Gracilaria, Macrocystis, Fucus, Laminaria, Sargassum, Turbinaria*, and *Durvilea*. In some embodiments, the extracts may comprise 50% or less by volume of the composition. In some embodiments, the extracts may comprise 40% or less by volume of the composition. In some embodiments, the extracts may comprise 30% or less by volume of the composition. In some embodiments, the extracts may comprise 20% or less by volume of the composition. In some embodiments, the extracts may comprise 10% or less by volume of the composition. In some embodiments, the extracts may comprise 5% or less by volume of the composition. In some embodiments, the extracts may comprise 4% or less by volume of the composition. In some embodiments, the extracts may comprise 3% or less by volume of the composition. In some embodiments, the extracts may comprise 2% or less by volume of the composition. In some embodiments, the extracts may comprise 1% or less by volume of the composition.

The term "microalgae" can refer to microscopic single cell organisms such as microalgae, cyanobacteria, algae, diatoms, dinoflagellates, freshwater organisms, marine organisms, or other similar single cell organisms capable of growth in phototrophic, mixotrophic, or heterotrophic culture conditions.

In some embodiments, *Laminaria* biomass or extracts may also be mixed with microalgae based biomass or extracts, such as but not limited to *Chlorella*, to make a composition that is beneficial when applied to plants, seeds, or soil. Non-limiting examples of microalgae that can be used in the compositions and methods of the inventive concepts described herein can comprise microalgae in the classes: Eustigmatophyceae, Chlorophyceae, Prasinophyceae, Haptophyceae, Cyanidiophyceae, Prymnesiophyceae, Porphyridiophyceae, Labyrinthulomycetes, Trebouxiophyceae, Bacillariophyceae, and Cyanophyceae. The class Cyanidiophyceae includes species of *Galdieria*. The class Chlorophyceae includes species of *Haematococcus, Scenedesmus, Chlamydomonas*, and *Micractinium*. The class Prymnesiophyceae includes species of *Isochrysis* and *Pavlova*. The class Eustigmatophyceae includes species of *Nannochloropsis*. The class Porphyridiophyceae includes species of *Porphyridium*. The class Labyrinthulomycetes includes species of *Schizochytrium* and *Aurantiochytrium*. The class Prasinophyceae includes species of *Tetraselmis*. The class Trebouxiophyceae includes species of *Chlorella*. The class Bacillariophyceae includes species of *Phaeodactylum*. The class Cyanophyceae includes species of *Spirulina*.

Non-limiting examples of microalgae genus and species that can be used in the compositions and methods described herein include: *Achnanthes orientalis, Agmenellum* spp., *Amphiprora hyaline, Amphora coffeiformis, Amphora coffeiformis* var. *linea, Amphora coffeiformis* var. *punctata, Amphora coffeiformis* var. *taylori, Amphora coffeiformis* var. *tenuis, Amphora delicatissima, Amphora delicatissima* var. *capitata, Amphora* spp., *Anabaena, Ankistrodesmus, Ankistrodesmus falcatus, Aurantiochytrium* spp., *Boekelovia hooglandii, Borodinella* spp., *Botryococcus braunii, Botryococcus sudeticus, Bracteococcus minor, Bracteococcus medionucleatus, Carteria, Chaetoceros gracilis, Chaetoceros muelleri, Chaetoceros muelleri* var. *subsalsum, Chaetoceros* spp., *Chlamydomonas* spp., *Chlamydomas perigranulata, Chlorella anitrata, Chlorella antarctica, Chlorella aureoviridis, Chlorella Candida, Chlorella capsulate, Chlorella desiccate, Chlorella ellipsoidea, Chlorella emersonii, Chlorella fusca, Chlorella fusca* var. *vacuolate, Chlorella glucotropha, Chlorella infusionum, Chlorella infusionum* var. *actophila, Chlorella infusionum* var. *auxenophila, Chlorella kessleri, Chlorella lobophora, Chlorella luteoviridis, Chlorella luteoviridis* var. *aureoviridis, Chlorella luteoviridis* var. *lutescens, Chlorella miniata, Chlorella minutissima, Chlorella mutabilis, Chlorella nocturna, Chlorella ovalis, Chlorella parva, Chlorella photophila, Chlorella pringsheimii, Chlorella protothecoides, Chlorella protothecoides* var. *acidicola, Chlorella regularis, Chlorella regularis* var. *minima, Chlorella regularis* var. *umbricata, Chlorella reisiglii, Chlorella saccharophila, Chlorella saccharophila* var. *ellipsoidea, Chlorella salina, Chlorella simplex, Chlorella sorokiniana, Chlorella* spp., *Chlorella sphaerica, Chlorella stigmatophora, Chlorella vanniellii, Chlorella vulgaris, Chlorella vulgaris fo. tertia, Chlorella vulgaris* var. *autotrophica, Chlorella vulgaris* var. *viridis, Chlorella vulgaris* var. *vulgaris, Chlorella vulgaris* var. *vulgaris fo. tertia, Chlorella vulgaris* var. *vulgaris fo. viridis, Chlorella xanthella, Chlorella zofingiensis, Chlorella trebouxioides, Chlorella vulgaris, Chlorococcum infusionum, Chlorococcum* spp., *Chlorogonium, Chroomonas* spp., *Chrysosphaera* spp., *Cricosphaera* spp., *Crypthecodinium cohnii, Cryptomonas* spp., *Cyclotella cryptica, Cyclotella meneghiniana, Cyclotella* spp., *Dunaliella* spp., *Dunaliella bardawil, Dunaliella bioculata, Dunaliella granulate, Dunaliella maritime, Dunaliella minuta, Dunaliella parva, Dunaliella peircei, Dunaliella primolecta, Dunaliella salina, Dunaliella terricola, Dunaliella tertiolecta, Dunaliella viridis, Dunaliella tertiolecta, Eremosphaera viridis, Eremosphaera* spp., *Ellipsoidon* spp., *Euglena* spp., *Franceia* spp., *Fragilaria crotonensis, Fragilaria* spp., *Galdieria* spp., *Gleocapsa* spp., *Gloeothamnion* spp., *Haematococcus pluvialis, Hymenomonas* spp., *Isochrysis aff. galbana, Isochrysis galbana, Lepocinclis, Micractinium, Monoraphidium minutum, Monoraphidium* spp., *Nannochloris* spp., *Nannochloropsis salina, Nannochloropsis* spp., *Navicula acceptata, Navicula biskanterae, Navicula*

*pseudotenelloides, Navicula pelliculosa, Navicula saprophila, Navicula* spp., *Nephrochloris* spp., *Nephroselmis* spp., *Nitschia communis, Nitzschia alexandrina, Nitzschia closterium, Nitzschia communis, Nitzschia dissipata, Nitzschia frustulum, Nitzschia hantzschiana, Nitzschia inconspicua, Nitzschia intermedia, Nitzschia microcephala, Nitzschia pusilla, Nitzschia pusilla elliptica, Nitzschia pusilla monoensis, Nitzschia quadrangular, Nitzschia* spp., *Ochromonas* spp., *Oocystis parva, Oocystis pusilla, Oocystis* spp., *Oscillatoria limnetica, Oscillatoria* spp., *Oscillatoria subbrevis, Parachlorella kessleri, Pascheria acidophila, Pavlova* spp., *Phaeodactylum tricornutum, Phagus, Phormidium, Platymonas* spp., *Pleurochrysis camerae, Pleurochrysis dentate, Pleurochrysis* spp., *Porphyridium* spp., *Prototheca wickerhamii, Prototheca stagnora, Prototheca portoricensis, Prototheca moriformis, Prototheca zopfii, Pseudochlorella aquatica, Pyramimonas* spp., *Pyrobotrys, Rhodococcus opacus, Sarcinoid chrysophyte, Scenedesmus armatus, Schizochytrium, Spirogyra, Spirulina platensis, Stichococcus* spp., *Synechococcus* spp., *Synechocystisf, Tagetes erecta, Tagetes patula, Tetraedron, Tetraselmis* spp., *Tetraselmis suecica, Thalassiosira weissflogii*, and *Viridiella fridericiana*.

Those of skill in the art will recognize that *Chlorella* and *Micractinium* appear closely related in many taxonomic classification trees for microalgae, and strains and species may be re-classified from time to time. Thus, for references throughout the instant specification for *Chlorella*, it is recognized that microalgae strains in related taxonomic classifications with similar characteristics to *Chlorella* would reasonably be expected to produce similar results.

Taxonomic classification has also been in flux for organisms in the genus *Schizochytrium*. Some organisms previously classified as *Schizochytrium* have been reclassified as *Aurantiochytrium, Thraustochytrium,* or *Oblongichytrium*. See Yokoyama et al. Taxonomic rearrangement of the genus *Schizochytrium* sensu lato based on morphology, chemotaxonomic characteristics, and 18S rRNA gene phylogeny (Thrausochytriaceae, Labyrinthulomycetes): emendation for *Schizochytrium* and erection of *Aurantiochytrium* and *Oblongichytrium* gen. nov. Mycoscience (2007) 48:199-211. Those of skill in the art will recognize that *Schizochytrium, Aurantiochytrium, Thraustochytrium,* and *Oblongichytrium* appear closely related in many taxonomic classification trees for microalgae, and strains and species may be re-classified from time to time. Thus, for references throughout the instant specification for *Schizochytrium*, it is recognized that microalgae strains in related taxonomic classifications with similar characteristics to *Schizochytrium*, such as *Aurantiochytrium*, would reasonably be expected to produce similar results.

In some embodiments, the microalgae may be cultured in phototrophic, mixotrophic, or heterotrophic culture conditions in an aqueous culture medium. The organic carbon sources suitable for growing microalgae mixotrophically or heterotrophically may comprise: acetate, acetic acid, ammonium linoleate, arabinose, arginine, aspartic acid, butyric acid, cellulose, citric acid, ethanol, fructose, fatty acids, galactose, glucose, glycerol, glycine, lactic acid, lactose, maleic acid, maltose, mannose, methanol, molasses, peptone, plant based hydrolyzate, proline, propionic acid, ribose, sacchrose, partial or complete hydrolysates of starch, sucrose, tartaric, TCA-cycle organic acids, thin stillage, urea, industrial waste solutions, yeast extract, and combinations thereof. The organic carbon source may comprise any single source, combination of sources, and dilutions of single sources or combinations of sources. In some embodiments, the microalgae may be cultured in axenic conditions. In some embodiments, the microalgae may be cultured in non-axenic conditions.

In one embodiment, the microalgae of the culture in an aqueous culture medium may comprise *Chlorella* spp., which can be cultured in mixotrophic conditions, which comprises a culture medium primary comprised of water with trace nutrients (e.g., nitrates, phosphates, vitamins, metals found in BG-11 recipe (available from UTEX The Culture Collection of Algae at the University of Texas at Austin, Austin, Tex.)), light as an energy source for photosynthesis, organic carbon (e.g., acetate, acetic acid) as both an energy source and a source of carbon. In some embodiments, the culture media may comprise BG-11 media or a media derived from BG-11 culture media (e.g., in which additional component(s) are added to the media and/or one or more elements of the media is increased by 5%, 10%, 15%, 20%, 25%, 33%, 50%, or more over unmodified BG-11 media). In some embodiments, the *Chlorella* may be cultured in non-axenic mixotrophic conditions in the presence of contaminating organisms, such as but not limited to bacteria.

In some embodiments, by artificially controlling aspects of the microalgae (e.g., *Chlorella*) culturing process such as the organic carbon feed (e.g., acetic acid, acetate), oxygen levels, pH, and light, the culturing process differs from the culturing process that microalgae may experience in nature. In addition to controlling various aspects of the culturing process, intervention by human operators or automated systems (e.g., auxostat system(s)) occurs during the non-axenic mixotrophic culturing of microalgae through contamination control methods to prevent the microalgae from being overrun and outcompeted by contaminating organisms (e.g., fungi, bacteria). By intervening in the microalgae culturing process, the impact of the contaminating microorganisms can be mitigated by suppressing the proliferation of contaminating organism populations and the effect on the microalgal cells (e.g., lysing, infection, death, clumping). Thus, through artificial control of aspects of the culturing process and intervening in the culturing process with contamination control methods, the microalgae culture produced as a whole and used in the described compositions differs from the culture that results from a microalgae culturing process that occurs in nature.

In some embodiments, during the culturing process the microalgae culture (e.g., *Chlorella*) may also comprise cell debris and compounds excreted from the microalgae cells into the culture medium. As an example, the output of the microalgae culturing process can provide one or more active ingredients for a composition that may be applied to plants, seeds, or soil for improving yield and quality. In one example, this type of composition may be applied without separate addition to, or supplementation of, the composition with other active ingredients that are not found in the mixotrophic microalgae whole cells and accompanying culture medium (e.g., the composition) from the culturing process; additional ingredients such as, but not limited to: microalgae extracts, macroalgae, macroalgae extracts, liquid fertilizers, granular fertilizers, mineral complexes (e.g., calcium, sodium, zinc, manganese, cobalt, silicon), fungi, bacteria, nematodes, protozoa, digestate solids, chemicals (e.g., ethanolamine, borax, boric acid), humic acid, nitrogen and nitrogen derivatives, phosphorus rock, pesticides, herbicides, insecticides, enzymes, plant fiber (e.g., coconut fiber).

In some embodiments, the mixotrophic microalgae (e.g., *Chlorella*) may be previously frozen and thawed before inclusion in the liquid composition. In some embodiments, the mixotrophic microalgae may not have been subjected to a previous freezing or thawing process. In some embodiments, the mixotrophic microalgae whole cells have not been subjected to a drying process. The cell walls of the mixotrophic microalgae of the composition have not been lysed or disrupted, and the mixotrophic microalgae cells have not been subjected to an extraction process or process that pulverizes the cells. The mixotrophic microalgae whole cells may not be subjected to a purification process for isolating the mixotrophic microalgae whole cells from the accompanying constituents of the culturing process (e.g., trace nutrients, residual organic carbon, bacteria, cell debris, cell excretions). The output from the mixotrophic microalgae culturing process can comprise whole microalgae cells, culture medium, cell excretions, cell debris, bacteria, residual organic carbon, and trace nutrients, which can be used in the liquid composition for application to plants, seeds, or soil. In some embodiments, the mixotrophic microalgae whole cells and the accompanying constituents of the culturing process can be concentrated in the composition. In some embodiments, the mixotrophic microalgae whole cells and the accompanying constituents of the culturing process can be diluted in the composition to a low concentration. The mixotrophic microalgae whole cells of the composition may not be fossilized. In some embodiments, the mixotrophic microalgae whole cells may not be maintained in a viable state in the composition to mitigate continued growth after the method of using the composition in a soil or foliar application. In some embodiments, the mixotrophic microalgae base composition may be biologically inactive after the composition is prepared. In some embodiments, the mixotrophic microalgae base composition may be substantially biologically inactive after the composition is prepared. In some embodiments, the mixotrophic microalgae base composition may increase in biological activity after the prepared composition is exposed to air.

In some embodiments, a liquid composition may comprise low concentrations of bacteria contributing to the solids percentage of the composition in addition to the whole mixotrophic microalgae cells (e.g., Chlorella). A live bacteria count may be determined using plate counts, plate counts using Petrifilm, spectrophotometric (turbidimetric) measurements, visual comparison of turbidity with a known standard, direct cell counts under a microscope, cell mass determination, and measurement of cellular activity, among other techniques. L In some embodiments, live bacteria counts in a non-axenic mixotrophic microalgae culture may range from $10^4$ to $10^9$ CFU/mL, and may be a result of contamination control measures taken during the culturing of the microalgae. In some implementations, the level of bacteria in the composition may be determined by an aerobic plate count which quantifies aerobic colony forming units (CFU) in a designated volume. In some embodiments, the composition can comprise an aerobic plate count of 40,000-400,000 CFU/mL. In some embodiments, the composition can comprise an aerobic plate count of 40,000-100,000 CFU/mL. In some embodiments, the composition can comprise an aerobic plate count of 100,000-200,000 CFU/mL. In some embodiments, the composition can comprise an aerobic plate count of 200,000-300,000 CFU/mL. In some embodiments, the composition can comprise an aerobic plate count of 300,000-400,000 CFU/mL.

In some embodiments, the macroalgae based composition (e.g., algal composition) can be supplemented with a supplemental nutrient such as nitrogen, phosphorus, or potassium to increase the levels within the composition to at least 1% of the total composition (e.g., addition of N, P, or K to increase levels at least 1-0-0, 0-1-0, 0-0-1, or combinations thereof). In some embodiments, the macroalgae composition may be supplemented with nutrients such as, but not limited to, calcium, magnesium, silicon, sulfur, iron, manganese, zinc, copper, boron, molybdenum, chlorine, sodium, aluminum, vanadium, nickel, cerium, dysprosium, erbium, europium, gadolinium, holmium, lanthanum, lutetium, neodymium, praseodymium, promethium, samarium, scandium, terbium, thulium, ytterbium, and yttrium. In some embodiments, the supplemented nutrient may not be taken up, chelated, or absorbed by the microalgae. In some embodiments, the concentration of the supplemental nutrient may comprise 1-50 g per 100 g of the composition.

A liquid composition comprising macroalgae extracts may be stabilized by heating and cooling in a pasteurization process. As discussed below, active ingredients of the Laminaria based composition (e.g., algal composition) can be used to maintain effectiveness in at least one characteristic of a plant after being subjected to the heating and cooling of a pasteurization process. In other embodiments, liquid compositions with biomass or other extracts of Laminaria may not be stabilized by pasteurization prior to use. For example, Laminaria biomass that has been processed, such as by drying, lysing, and extraction, or extracts, may comprise low levels of bacteria, such that a liquid composition may remain stable without being subjected to the heating and cooling of a pasteurization process.

In some embodiments, the composition may be heated to a temperature in the range of 50-70° C. In some embodiments, the composition may be heated to a temperature in the range of 55-65° C. In some embodiments, the composition may be heated to a temperature in the range of 58-62° C. In some embodiments, the composition may be heated to a temperature in the range of 50-60° C. In some embodiments, the composition may be heated to a temperature in the range of 60-70° C.

In some embodiments, the composition may be heated for a time period in the range of 90-150 minutes. In some embodiments, the composition may be heated for a time period in the range of 110-130 minutes. In some embodiments, the composition may be heated for a time period in the range of 90-100 minutes. In some embodiments, the composition may be heated for a time period in the range of 100-110 minutes. In some embodiments, the composition may be heated for a time period in the range of 110-120 minutes. In some embodiments, the composition may be heated for a time period in the range of 120-130 minutes. In some embodiments, the composition may be heated for a time period in the range of 130-140 minutes. In some embodiments, the composition may be heated for a time period in the range of 140-150 minutes.

In some implementation, after the step of heating or subjecting the liquid composition to high temperatures is complete, the compositions may be cooled at a desired rate to a desired temperature, such as one that is safe to use. In one non-limiting embodiment, the composition may be cooled to a temperature in the range of 35-45° C. In some embodiments, the composition may be cooled to a temperature in the range of 36-44° C. In some embodiments, the composition may be cooled to a temperature in the range of 37-43° C. In some embodiments, the composition may be cooled to a temperature in the range of 38-42° C. In some embodiments, the composition may be cooled to a temperature in the range of 39-41° C. In further embodiments, the pasteurization process may be part of a continuous production process can involve packaging, and thus the liquid composition may be packaged (e.g., bottled) after the heating or high temperature stage, for example, without a cooling step.

In some embodiments, the composition may comprise 5-30% by weight of macroalgae extracts (e.g., 5-30 g of macroalgae extracts/100 mL of the liquid composition). In some embodiments, the composition may comprise 5-20% by weight of macroalgae extracts. In some embodiments, the composition may comprise 5-15% by weight of macroalgae extracts. In some embodiments, the composition may comprise 5-10% by weight of macroalgae extracts. In some embodiments, the composition may comprise 10-20% by weight of macroalgae extracts. In some embodiments, the composition may comprise 10-20% by weight of macroalgae extracts. In some embodiments, the composition may comprise 20-30% by weight of macroalgae extracts. In some embodiments, further dilution of the macroalgae extracts by weight may occur before application for low concentration applications of the composition.

In some embodiments, the composition may comprise less than 1% by weight of macroalgae extracts (e.g., less than 1 g of macroalgae derived product/100 mL of the liquid composition). In some embodiments, the composition may comprise less than 0.9% by weight of macroalgae extracts. In some embodiments, the composition may comprise less than 0.8% by weight of macroalgae extracts. In some embodiments, the composition may comprise less than 0.7% by weight of macroalgae extracts. In some embodiments, the composition may comprise less than 0.6% by weight of macroalgae extracts. In some embodiments, the composition may comprise less than 0.5% by weight of macroalgae extracts. In some embodiments, the composition may comprise less than 0.4% by weight of macroalgae extracts. In some embodiments, the composition may comprise less than 0.3% by weight of macroalgae extracts. In some embodiments, the composition may comprise less than 0.2% by weight of macroalgae extracts. In some embodiments, the composition may comprise less than 0.1% by weight of macroalgae extracts. In some embodiments, the composition may comprise at least 0.0001% by weight of macroalgae extracts. In some embodiments, the composition may comprise at least 0.001% by weight of macroalgae extracts. In some embodiments, the composition may comprise at least 0.01% by weight of macroalgae extracts. In some embodiments, the composition may comprise 0.00001-1% by weight of macroalgae extracts. In some embodiments, the composition may comprise 0.0001-0.001% by weight of macroalgae extracts. In some embodiments, the composition may comprise 0.001-.01% by weight of macroalgae extracts. In some embodiments, the composition may comprise 0.01-0.1% by weight of macroalgae extracts. In some embodiments, the composition may comprise 0.1-1% by weight of macroalgae extracts.

In some embodiments, an application concentration of 0.1% of macroalgae extracts may be substantially equivalent to 0.04 g of macroalgae extracts in 40 mL of a composition. As an illustrative example, a desired application concentration to a plant (e.g., soil, seed, etc.) may be 0.1% of macroalgae extracts, and the composition may be disposed as a 10% concentration (0.1 mL in 1 mL of a composition). In this example, a desired application concentration of 1.6% may utilize 6,000 mL of the 10% macroalgae extracts disposed in 100 gallons of water, applied to 15,000 plants in an acre, which is equivalent to an application rate of about 1.585 gallons per acre. In some embodiments, a desired application concentration of 0.01% of macroalgae extracts using a 10% concentration composition may be equivalent to an application rate of about 0.159 gallons per acre. In some embodiments, a desired application concentration of 0.001% of macroalgae extracts using a 10% concentration composition may be equivalent to an application rate of about 0.016 gallons per acre. In some embodiments, a desired application concentration of 0.0001% of macroalgae extracts using a 10% concentration composition may be equivalent to an application rate of about 0.002 gallons per acre.

As another illustrative example, application of a ten percent concentration solution of the macroalgae extracts on a per plant basis, such as where there are 15,000 plants per acre, the composition application rate of 1 gallon per acre may be substantially equivalent to about 0.2523 mL of extracts per plant, which may be equivalent to about 0.025 g per plant, or about 25.0 mg of macroalgae extracts per plant. In this example, the water utilized at about 100 gallons per acre may be substantially equivalent to about 25 mL of water per plant. Therefore, in this example, 0.025 g of macroalgae extracts in 25 mL of water is substantially equivalent to about 0.1% application concentration of macroalgae extracts. In some embodiments, the macroalgae extracts based composition (e.g., algal composition) may be applied at a rate in a range as low as about 0.001-10 gallons per acre, or as high as up to 150 gallons per acre.

In some embodiments, stabilizing component that aid in stabilizing the composition may be added to mitigate proliferation of undesired microorganisms (e.g., yeast, mold), and/or to prolong shelf life. As an example, the stabilizing components may not be added to provide for improvement of plant germination, emergence, maturation, quality, and yield, but merely for stabilization. In one implementation, a stabilizing agent may comprise an acid, such as but not limited to phosphoric acid or citric acid, and/or a yeast and mold inhibitor, such as but not limited to potassium sorbate. In some embodiments, the stabilizing agent may be suitable for use with plants (e.g., and plant matter), and may not inhibit the growth or health of the plant (e.g., or other plant matter). As an alternative implementation, the stabilizing agent(s) may provide some form of nutritional benefit for the liquid composition, such as but not limited to, providing desired levels of nitrogen, phosphorus, and/or potassium.

In some embodiments, the composition may comprise less than 0.3% phosphoric acid. In some embodiments, the composition may comprise 0.01-0.3% phosphoric acid. In some embodiments, the composition may comprise 0.05-0.25% phosphoric acid. In some embodiments, the composition may comprise 0.01-0.1% phosphoric acid. In some embodiments, the composition may comprise 0.1-0.2% phosphoric acid. In some embodiments, the composition may comprise 0.2-0.3% phosphoric acid. In some embodiments, the composition may comprise less than 0.3% citric acid. In some embodiments, the composition may comprise 0.01-0.3% citric acid. In some embodiments, the composition may comprise 0.05-0.25% citric acid. In some embodiments, the composition may comprise 0.01-0.1% citric acid. In some embodiments, the composition may comprise 0.1-0.2% citric acid. In some embodiments, the composition may comprise 0.2-0.3% citric acid.

In some embodiments, the composition may comprise less than 0.5% potassium sorbate. In some embodiments, the composition may comprise 0.01-0.5% potassium sorbate. In some embodiments, the composition may comprise 0.05-0.4% potassium sorbate. In some embodiments, the composition may comprise 0.01-0.1% potassium sorbate. In some embodiments, the composition may comprise 0.1-0.2% potassium sorbate. In some embodiments, the composition may comprise 0.2-0.3% potassium sorbate. In some embodiments, the composition may comprise 0.3-0.4% potassium sorbate. In some embodiments, the composition may comprise 0.4-0.5% potassium sorbate.

In some embodiments, the composition is a liquid, for example, which may comprise water. In some embodiments, the composition may comprise 70-99% water. In some embodiments, the composition may comprise 85-95% water. In some embodiments, the composition may comprise 70-75% water. In some embodiments, the composition may comprise 75-80% water. In some embodiments, the composition may comprise 80-85% water. In some embodiments, the composition may comprise 85-90% water. In some embodiments, the composition may comprise 90-95% water. In some embodiments, the composition may comprise 95-99% water. The liquid nature and high water content of the composition facilitates administration of the composition in a variety of manners, such as but not limited to: flowing through a hydroponic circulation system, flowing through an irrigation system, flowing through an above ground drip irrigation system, flowing through a buried drip irrigation system, flowing through an aeroponic irrigation system, flowing through a central pivot irrigation system, sprayers, sprinklers, and water cans.

In some embodiments, the liquid composition may be used after formulation (e.g., such as immediately after or at the time of formulation). Alternately, the liquid composition can be stored (e.g., such as in containers) for later use. In some embodiments, it may be desirable to store the composition out of direct sunlight. In some embodiments, the composition may be refrigerated. In some embodiments, the composition may be stored at 1-10° C. In some embodiments, the composition may be stored at 1-3° C. In some embodiments, the composition may be stored at 3-5° C. In some embodiments, the composition may be stored at 5-8° C. In some embodiments, the composition may be stored at 8-10° C.

In some embodiments, administration of the liquid composition to a seed or plant (e.g., or other plant matter) may be in an amount effective to produce an enhanced characteristic in a plant, such as when compared to a substantially identical population of untreated seeds or plants. As an example, such enhanced characteristics may comprise accelerated seed germination, accelerated seedling emergence, improved seedling emergence, improved leaf formation, accelerated leaf formation, improved plant maturation, accelerated plant maturation, increased plant yield, increased plant growth, increased plant quality, increased plant health, increased fruit yield, increased fruit growth, and/or increased fruit quality. Non-limiting examples of such enhanced characteristics may comprise accelerated achievement of the hypocotyl stage, accelerated protrusion of a stem from the soil, accelerated achievement of the cotyledon stage, accelerated leaf formation, increased marketable plant weight, increased marketable plant yield, increased marketable fruit weight, increased production plant weight, increased production fruit weight, increased utilization (e.g., indicator of efficiency in the agricultural process based on ratio of marketable fruit to unmarketable fruit), increased chlorophyll content (e.g., indicator of plant health), increased plant weight (e.g., indicator of plant health), increased root weight (e.g., indicator of plant health), increased shoot weight (e.g., indicator of plant health), increased plant height, increased thatch height, increased resistance to salt stress, increased plant resistance to heat stress (e.g., temperature stress), increased plant resistance to heavy metal stress, increased plant resistance to drought, increased plant resistance to disease, improved color, reduced insect damage, reduced blossom end rot, and/or reduced sun burn. Such enhanced characteristics may occur individually in a plant, or in combinations of multiple enhanced characteristics.

In some embodiments, the macroalgae extracts may be combined with microalgae biomass which may be dried or dehydrated to form a composition of macroalgae extracts and dried microalgae biomass (e.g., reduced moisture content). The microalgae biomass may be dried by at least one method selected from the group consisting of: freeze drying (e.g., lypohilization), drum (e.g., rotary) drying, spray drying, crossflow air drying, solar drying, vacuum shelf drying, pulse combustion drying, flash drying, furnace drying, belt conveyor drying, and refractance window drying. In some embodiments, the microalgae cells may be dried by a combination of two or more methods, such as in a process with multiple drying methods in series. The process of drying the biomass may reduce the percent moisture (e.g., on a wet basis) to the range of about 1-15% and result in a cake, flakes, or a powder, which is more uniform and more stable than the wet culture of macroalgae. In some embodiments, the dried microalgae may be intact. In some embodiments, the dried microalgae may be lysed or disrupted. In some embodiments, the microalgae may be lysed or disrupted prior to or after drying by mechanical, electrical, acoustic, or chemical means. In some embodiments, drying the microalgae can achieve suitable product stability for storage, for example, which may mitigate use of chemical stabilizers for the same purpose. The composition may be stored in a suitable manner, such as in an appropriate container like a bag, bucket, jug, tote, bottle, etc.

In some embodiments, the dried microalgae biomass may have a moisture content of 1-15% on a wet basis. In some embodiments, the dried microalgae biomass may have a moisture content of 1-2% on a wet basis. In some embodiments, the dried microalgae biomass may have a moisture content of 2-3% on a wet basis. In some embodiments, the dried microalgae biomass may have a moisture content of 3-5% on a wet basis. In some embodiments, the dried microalgae biomass may have a moisture content of 5-7% on a wet basis. In some embodiments, the dried microalgae biomass may have a moisture content of 7-10% on a wet basis. In some embodiments, the dried microalgae biomass may have a moisture content of 10-12% on a wet basis. In some embodiments, the dried microalgae biomass may have a moisture content of 12-15% on a wet basis. In some embodiments, the dried microalgae biomass may have a moisture content of 1-8% on a wet basis. In some embodiments, the dried microalgae biomass may have a moisture content of 8-15% on a wet basis.

The various drying processes may have different capabilities such as, but not limited to, the amount of moisture that may be removed, the preservation of metabolites (e.g., proteins, lipids, pigments, carbohydrates, polysaccharides, soluble nitrogen, phytohormones), and the effect on the cell wall or membrane. For example, an amount of protein in resulting *Spirulina* biomass may be reduced proportionally as the drying temperature increases. Additionally, for example, drying at high temperatures can alter polymer chains, alter interactions between polysaccharide and glycoprotein, and may increase bound water content of polysaccharides. Further, for example, different drying processes can lead to varying amounts of oxidization and/or de-stabilization of pigments and fatty acids. The effectiveness of a drying method may also vary based on a subject microalgae species due to different physical characteristics of respective microalgae (e.g., sheer sensitivity, cell size, cell wall thickness and composition). The method of drying and/or drying method parameters may also result in a structural change to the microalgae cell such as, but not limited to, increased porosity in the cell wall, changes in the cell wall make up or bonds, and measurable changes in cell characteristics (e.g., elasticity, viscosity, digestibility); which may correlate to functional differences when applied to plant products. As one example, drying microalgae using a combination of methods, in series, may also result in structural and functional changes, may mitigate structural and functional changes, and/or may increase the effectiveness of a particular type of microalgae. The appropriate drying method for the particular application, desired results, desired characteristics, and/or subject microalgae(s) may be selected based on sound scientific and/or engineering principles.

In one implementation, drum drying can comprise the use of sloped, rotating cylinders which use gravity to move the microalgal biomass from one end to the other. Drum drying may be conducted with direct contact between a hot gas (e.g., heated air) and the microalgal biomass, or indirect heating in which the gas and microalgal biomass is separated by a barrier such as a steel shell. A non-limiting example of a drum drying process for Scenedesmus may comprise 10 seconds of heating at 120° C. Possible effects to the microalgal biomass in a drum drying process include sterilization of the biomass, and/or breaking of the cell wall. Microalgal biomass that is drum dried may have higher digestibility characteristics (e.g., by target plant matter, and/or soil systems) than microalgal biomass that is spray dried.

In some implementations, freeze drying can comprise freezing the microalgal biomass and transferring the frozen biomass to a vacuum chamber with reduced pressure (e.g., 4.6 Torr). In this implementation, in the vacuum chamber, ice in the microalgal biomass changes to vapor through sublimation, which is collected on a cold condenser and removed from the vacuum chamber. Freeze drying typically mitigates degradation of unsaturated fatty acids and pigments (e.g., carotenoids) through oxidation, which can improve the nutritional value of the microalgal biomass. While targeted removal of water in the freeze drying process may be beneficial, the process can be costly and time consuming, which may make freeze drying less practical for some commercial applications. In some embodiments, microalgae dried by freeze drying may comprise 2-6% moisture (on a wet basis). A non-limiting example of a freeze drying process for Scenedesmus may comprise subjecting the target biomass to −84° C. for approximately 24 hours. As an example, freeze drying can help maintain integrity of the microalgal cell, but may, in some cases, disrupt the cell or increase the pore size in the cell wall. For Scenedesmus, freeze drying can decrease cell wall rigidity, may increase surface area by 165%, and can increase pore size by 19% in the cells. For Phaeodactylum ricornutum, freeze drying may have little effect on total lipid content, can make the cells more susceptible to lipolysis (e.g., breakdown of lipids, hydrolysis of triglycerides into glycerol and free fatty acids) upon storage than spray dried cells, and may make the cells less susceptible to oxidation than spray dried cells.

As an illustrative example, spray drying can comprise atomizing an aqueous microalgae culture composition into droplets sprayed into a vertical tower through which hot gases are passed. In this example, the gas stream may be exhausted through a cyclonic separator. The process of spray drying can be costly, but may be less costly than freeze drying. Using an appropriate burner, the presence of oxygen can be mitigated from a recycled drying gas, which mitigates oxidation of oxygen sensitive products (e.g., carotenoids). In some embodiments, microalgae dried by spray drying may comprise 1-7% moisture (e.g., on a wet basis). Examples of spray drying systems can comprise: box dryers, tall-form spray dryers, fluidized bed dryers, and moving fluidized bed dryers (e.g., FilterMat spray dryer GEA Process Engineering Inc.). As one example, an open cycle spray dryer may use a direct fired air heater to operate at elevated temperatures (e.g., 60-93° C.), and at elevated oxygen concentrations (e.g., 19-20%). Some effects of spray drying on microalgal biomass can include rupturing the cell walls, reduction of protein content by 10-15%, deterioration of pigments (e.g., depending on the oxygen concentration), and/or a lower potential digestibility than drum drying. For example, for Phaeodactylum ricornutum, spray drying had little effect on the total lipid content, made the cells less susceptible to lipolysis than freeze drying, and made the cells more susceptible to oxidation than freeze drying (e.g., possibly due to the breakdown of protective carotenoids).

As an illustrative example, crossflow air drying can use movement of heated air across a layer of microalgae, such as disposed on a tray, rack, or the like, which may be a modification of indirect solar and convection oven driers. For example, crossflow air drying can be faster than solar drying, may be less expensive than drum drying, and may not break the microalgal cell wall. In some embodiments, microalgae dried by crossflow air drying may comprise 8-12% moisture (on a wet basis). Non-limiting examples of crossflow air drying for *Spirulina* may comprise: 1) using a temperature of 62° C. for 14 hours, 2) using a temperature of 50-60° C., a relative humidity of 7-10%, an air velocity of 1.5 m/s, and/or a duration of 150-220 minutes, 3) using a temperature of 40-60° C. and/or an air velocity of 1.9-3.8 m/s, and 4) using temperatures of 50-70° C. for layers of 3-7 mm in a perforated tray with parallel air flow. As an example, crossflow air drying of *Spirulina* may result in loss of protein of about 17% and a loss of phycocyanin of 37-50%. During drying, degradation of phycocyanin may occur above 60° C.; however, little change in the fatty acid composition may occur using the crossflow air drying methods.

Non-limiting examples of crossflow air drying of *Chlorella kessleri* and *Chlamydomonas reinhardtii* may comprise using a temperature of 55° C. for more than 5 hours. Crossflow air drying of *Chlorella kessleri* and *Chlamydomonas reinhardtii* may result in reduction of chlorophyll relative to the dry cell weight, an increase of total fatty acid content relative to the dry cell, a decrease of polar lipids relative to the dry cell weight, and/or a decrease in the availability of nutritional salts (e.g., Sulphur S, Nitrogen N). A cell's sensitivity to air drying stress (e.g., as measured through the change in chlorophyll) may be a result of cell wall properties. For example, crossflow air drying *Chlamydomonas reinhardtii* (e.g., comprising hydroxyproline-rich glucoprotein based cell walls) may result in a larger decrease in chlorophyll than the *Chlorella kessleri* (e.g., comprising sugar based cell walls), which may be associated with the cell wall's ability to restructure in S and N deficient conditions. In a non-limiting example of drying 5-7 mm thick layers of *Aphanothece microscopia Nageli* at temperatures of 40-60° C. with parallel air flow of 1.5 m/s, the drying conditions can influence the concentrations of protein, carbohydrates, and lipids in the biomass.

As another illustrative example, solar drying methods may comprise the use of direct solar radiation to dry microalgae on sand or a plastic sheet (e.g., or other surfaces), or the indirect use of solar radiation to heat air that is circulated around microalgae in a dryer. In this example, direct solar drying is weather dependent, can be slow, and may utilize a short duration of high heat (e.g., 120° C.) to increase the biological value of the microalgal biomass. A non-limiting example of a direct solar drying process for *Scenedesmus* may comprise disposed a 1,500 micron thick layer of biomass on a drying bed liner (e.g., white plastic), at a temperature of 25-30° C., for a duration of 72 hours. In this example, results of direct solar drying on microalgal biomass can include chlorophyll degradation, overheating of the biomass, and/or creation of an unpleasant odor. As another example, indirect solar drying may mitigate overheating, can result in a higher drying rate than direct solar drying, but may result in a less attractive profile (e.g., resulting product characteristics) in the final product. As an example, an indirect solar drying method for microalgae may comprise using temperatures of 65-70° C. for 0.5-6 hours.

As another example, a microalgae biomass can be dried as a thin film in a convection oven, such as for species of *Chlorella, Chlamydomonas*, and *Scenedesmus*. In some embodiments, microalgae dried by oven drying may result in a 6-10% moisture content (e.g., on a wet basis). In some embodiments, microalgae dried by oven drying may comprise using temperatures of 30-90° C., and/or durations of 4-12 hours. As an example, thin film convection oven dried microalgal biomass can result in little change in a resulting fatty acid profile, and may result in a minor decrease in the degree of unsaturation of fatty acids for ruptured cells resulting from higher temperatures (e.g., likely due to oxidation causing cleavage of unsaturated bonds).

As another illustrative example, microalgae can be dried in thin layers using elevated heat at a reduced pressure. As a non-limiting example, *Spirulina* can be dried in layers within a vacuum, and may utilize temperatures of 50-65° C. and/or a pressure of 0.05-0.06 atm. As an example, resulting effects on the microalgae from vacuum shelf drying can comprise development of a hygroscopic property (e.g., ability to attract and hold water particles from the surrounding environment by absorption or adsorption), and/or development of a porous structure.

As another illustrative example, microalgae can be dried using pulse combustion, which utilizes one or more blasts of controlled heat that can flash dry the microalgae. In this example, air is can be pumped into a combustion chamber, mixed with a fuel and ignited resulting in pressurized hot gases (e.g., at 3 psi). In one implementation, the dryer may automatically blast the heated gas with quench air to control the temperature of the heated gas before coming into contact with the microalgae. In this example, the process can be repeated to provide additional pulses of heated gas. As an example, pulse combustion heating can dry microalgae at a low heat, which may improve the integrity and nutritional value of the microalgae. As another illustrative example, microalgae can be dried using flash drying, which comprises spraying or injecting a mixture of dried and undried material into a hot gas stream.

As another illustrative example, microalgae can be dried using an incinerator or furnace, which may comprise heating the biomass to an elevated temperature (e.g., 100° C.) to evaporate the water. For example, heating may be performed at a level below the temperature at which the microalgae will burn, and may comprise using hot gases that flow with the biomass in parallel flow. As one example, microalgae that are dewatered to a desired solids level may be dried indirectly by heating elements disposed along the pathway of a conveyor comprising the biomass. As another illustrative example, microalgae can be dried using refractance window drying, which can use infra-red light, rather than high direct temperature, to remove moisture from microalgae. In this example, wet microalgae biomass may be translated through an evaporation chamber by a conveyor disposed above a circulating hot water reservoir to dry the microalgae with infra-red energy in the refractance window drying. In some embodiments, microalgae dried by refractance window drying may comprise 3-8% moisture content (e.g., on a wet basis).

In some embodiments, the resulting dry composition may be subjected to one or more post drying steps, such as mixing with water, stabilizing by heating and cooling in a pasteurization process, adjustment of pH, addition of an inhibitor of yeast and mold growth, and/or combinations thereof. In one non-limiting example of preparing the dried microalgae composition for application to plants, the microalgae harvested from the culturing system can be held in a harvest tank, and subsequently centrifuging the culture. In this example, centrifuging of the microalgae can produce centrifuge discharges of a fraction rich in microalgae whole cell solids, which also contains accompanying constituents from the culture medium, which may be deposited into a container at a temperature of about 30° C. In one implementation, the microalgae composition may then be dried.

Administration of one or more compositions, described herein, in low concentration applications can be effective in producing enhanced characteristics in plants. In some embodiments, a liquid composition may be administered before the seed is planted. In some embodiments, a liquid composition may be administered at the time the seed is planted. In some embodiments, a liquid composition may be administered after the seed is planted. In some embodiments, a liquid composition may be administered to plants that have emerged from the ground. In some embodiments, a dried composition may be applied to the soil before, during, or after the planting of a seed. In some embodiments, a dried composition may be applied to the soil before or after a plant emerges from the soil.

In some embodiments, for methods of application of the one or more compositions, described herein, volume or mass of the macroalgae based composition (e.g., algal composition) applied to a seed, seedling, or plant may not be increased or decreased during the growth cycle of the plant (e.g., the amount of the macroalgae based composition applied to the plant is not significantly altered as the plant grows larger). In some embodiments, for methods of application of the one or more compositions, described herein, the volume or mass of the macroalgae based composition applied to a seed, seedling, or plant may be increased during the growth cycle of the plant (e.g., applied on a mass or volume per plant mass basis to provide more of the macroalgae based composition as the plant grows larger). In some embodiments, for methods of application of the one or more compositions, described herein, the volume or mass of the macroalgae based composition applied to a seed, seedling, or plant may be decreased during the growth cycle of the plant (e.g., applied on a mass or volume per plant mass basis to provide less of the macroalgae based composition as the plant grows larger).

Seed Soak Application

In one non-limiting embodiment, the administration of one or more of the liquid compositions, described herein, may comprise soaking the seed in an effective amount of the liquid composition before planting the seed. In some embodiments, the administration of one or more of the liquid compositions, described herein, can further comprise removing the seed from the liquid composition after soaking, and drying the seed before planting. In some embodiments, the seed may be soaked in the liquid composition for a time period in the range of 90-150 minutes. In some embodiments, the seed may be soaked in the liquid composition for a time period in the range of 110-130 minutes. In some embodiments, the seed may be soaked in the liquid composition for a time period in the range of 90-100 minutes. In some embodiments, the seed may be soaked in the liquid composition for a time period in the range of 100-110 minutes. In some embodiments, the seed may be soaked in the liquid composition for a time period in the range of 110-120 minutes. In some embodiments, the seed may be soaked in the liquid composition for a time period in the range of 120-130 minutes. In some embodiments, the seed may be soaked in the liquid composition for a time period in the range of 130-140 minutes. In some embodiments, the seed may be soaked in the liquid composition for a time period in the range of 140-150 minutes.

In some implementation of applying the one or more of the liquid compositions, described herein, the composition may be diluted to a lower concentration for an effective amount in a seed soak application by mixing a volume of the composition in a volume of water. As one example, the concentration of macroalgae sourced components in the diluted composition may be calculated by multiplying the original concentration in the composition by the ratio of the volume of the composition to the volume of water. Alternatively, for example, the grams of macroalgae sourced components in the diluted composition can be calculated by multiplying the original grams of macroalgae sourced components per 100 mL by the ratio of the volume of the composition to the volume of water.

Soil Application—Seed

In another non-limiting embodiment, administration of one or more of the compositions, described herein, may comprise contacting the soil in the immediate vicinity of the planted seed with an effective amount one or more of the liquid compositions, described herein. In some embodiments, one or more of the liquid compositions, described herein, may be applied to the soil by injection into a low volume irrigation system, such as but not limited to a drip irrigation system supplying water beneath the soil through perforated conduits or at the soil level by fluid conduits hanging above the ground or protruding from the ground. In some embodiments, the liquid composition may be supplied to the soil by a soil drench method wherein the liquid composition is poured on the soil.

In some implementations, the composition may be diluted to a lower concentration, as an effective amount in a soil application, by mixing a volume of the composition with a volume of water. As an example, the concentration of macroalgae sourced components found in the diluted composition can be calculated by multiplying the concentration in the base composition by the ratio of the volume of the composition to the volume of water. Alternatively, the weight (e.g., in grams) of macroalgae sourced components found in the diluted composition can be calculated by multiplying the weight of the base macroalgae sourced components per volume by the ratio of the volume of the composition to the volume of water.

In some implementations, the rate of application of the composition at a desired concentration can be expressed as a volume of applied liquid composition per area of land. In some embodiments, the rate of application of one or more of the liquid compositions, describe herein, in a soil application may comprise a rate in the range of 50-150 gallons/acre. In some embodiments, the rate of application of the liquid composition in a soil application may comprise a rate in the range of 75-125 gallons/acre. In some embodiments, the rate of application of the liquid composition in a soil application may comprise a rate in the range of 50-75 gallons/acre. In some embodiments, the rate of application of the liquid composition in a soil application may comprise a rate in the range of 75-100 gallons/acre. In some embodiments, the rate of application of the liquid composition in a soil application may comprise a rate in the range of 100-125 gallons/acre. In some embodiments, the rate of application of the liquid composition in a soil application may comprise a rate in the range of 125-150 gallons/acre.

In some embodiments, the rate of application of the liquid composition in a soil application may comprise a rate in the range of 10-50 gallons/acre. In some embodiments, the rate of application of the liquid composition in a soil application may comprise a rate in the range of 10-20 gallons/acre. In some embodiments, the rate of application of the liquid composition in a soil application may comprise a rate in the range of 20-30 gallons/acre. In some embodiments, the rate of application of the liquid composition in a soil application may comprise a rate in the range of 30-40 gallons/acre. In some embodiments, the rate of application of the liquid composition in a soil application may comprise a rate in the range of 40-50 gallons/acre.

In some embodiments, the rate of application of the liquid composition in a soil application may comprise a rate in the range of 0.01-10 gallons/acre. In some embodiments, the rate of application of the liquid composition in a soil application may comprise a rate in the range of 0.01-0.1 gallons/acre. In some embodiments, the rate of application of the liquid composition in a soil application may comprise a rate in the range of 0.1-1.0 gallons/acre. In some embodiments, the rate of application of the liquid composition in a soil application may comprise a rate in the range of 1-2 gallons/acre. In some embodiments, the rate of application of the liquid composition in a soil application may comprise a rate in the range of 2-3 gallons/acre. In some embodiments, the rate of application of the liquid composition in a soil application may comprise a rate in the range of 3-4 gallons/acre. In some embodiments, the rate of application of the liquid composition in a soil application may comprise a rate in the range of 4-5 gallons/acre. In some embodiments, the rate of application of the liquid composition in a soil application may comprise a rate in the range of 5-10 gallons/acre.

In some embodiments, the rate of application of the liquid composition in a soil application may comprise a rate in the range of 2-20 liters/acre. In some embodiments, the rate of application of the liquid composition in a soil application may comprise a rate in the range of 3.7-15 liters/acre. In some embodiments, the rate of application of the liquid composition in a soil application may comprise a rate in the range of 2-5 liters/acre. In some embodiments, the rate of application of the liquid composition in a soil application may comprise a rate in the range of 5-10 liters/acre. In some embodiments, the rate of application of the liquid composition in a soil application may comprise a rate in the range of 10-15 liters/acre. In some embodiments, the rate of application of the liquid composition in a soil application may comprise a rate in the range of 15-20 liters/acre.

Capillary Action Application

In another non-limiting embodiment, the administration of one or more of the compositions, described herein, may comprise first soaking the seed in water, removing the seed from the water, drying the seed, applying an effective amount of one or more of the liquid compositions, described herein, below the seed planting level in the soil, and planting the seed, wherein the liquid composition can be provided to the seed by capillary action from the soil. In some embodiments, the seed may be soaked in water for a time period in the range of 90-150 minutes. In some embodiments, the seed may be soaked in water for a time period in the range of 110-130 minutes. In some embodiments, the seed may be soaked in water for a time period in the range of 90-100 minutes. In some embodiments, the seed may be soaked in water for a time period in the range of 100-110 minutes. In some embodiments, the seed may be soaked in water for a time period in the range of 110-120 minutes. In some embodiments, the seed may be soaked in water for a time period in the range of 120-130 minutes. In some embodiments, the seed may be soaked in water for a time period in the range of 130-140 minutes. In some embodiments, the seed may be soaked in water for a time period in the range of 140-150 minutes.

In some implementations, one or more of the compositions, described herein, may be diluted to a lower concentration, as an effective amount in a capillary action application, by mixing a volume of the composition with a volume of water. As an example, the concentration of macroalgae sourced components found in the diluted composition can be calculated by multiplying the base concentration in the composition by the ratio of the volume of the composition to the volume of water. Alternatively, the weight (e.g., in grams) of macroalgae sourced components found in the diluted composition can be calculated by multiplying the original weight of base macroalgae sourced components per volume (e.g., in milliliters (mL)) by the ratio of the volume of the composition to the volume of water.

Hydroponic or Aeroponic Application

In another non-limiting embodiment, the administration of one or more of the compositions, described herein, to a seed or plant may comprise applying one or more of the macroalgae based compositions, described herein, in combination with a nutrient medium (e.g., as a solution, combined into a liquid composition) to seeds, plants, or other plant matter. In some embodiments, the composition-nutrient medium composition can be applied to the seeds, plants, or other plant matter disposed in a hydroponic growth medium or an inert growth medium (e.g., coconut husks). In some embodiments, the composition-nutrient medium composition can be applied to the seeds, plants, or other plant matter disposed in an aeroponic system. As an example, the liquid composition may be applied one or more times per day, per week, or per growing season.

Foliar Application

In one non-limiting embodiment, the administration of one or more of the compositions, described herein, may comprise application of an effective amount of the composition to the foliage of the plant. In some embodiments, one or more of the liquid compositions, described herein, may be sprayed (e.g., or otherwise applied) on the foliage by a hand sprayer, a sprayer on an agriculture implement, or a sprinkler.

In some implementations, one or more of the compositions, described herein, may be diluted to a lower concentration, as an effective amount in a capillary action application, by mixing a volume of the composition with a volume of water. As an example, the concentration of macroalgae sourced components found in the diluted composition can be calculated by multiplying the base concentration in the composition by the ratio of the volume of the composition to the volume of water. Alternatively, the weight (e.g., in grams) of macroalgae sourced components found in the diluted composition can be calculated by multiplying the original weight of base macroalgae sourced components per volume (e.g., in milliliters (mL)) by the ratio of the volume of the composition to the volume of water.

In some implementations, a rate of application of one or more of the compositions, described herein, at the desired concentration may be expressed as a volume of composition applied per area of land. In some embodiments, the rate of application of the liquid composition in a foliar application may comprise a rate in the range of 10-50 gallons/acre. In some embodiments, the rate of application of the liquid composition in a foliar application may comprise a rate in the range of 10-15 gallons/acre. In some embodiments, the rate of application of the liquid composition in a foliar application may comprise a rate in the range of 15-20 gallons/acre. In some embodiments, the rate of application of the liquid composition in a foliar application may comprise a rate in the range of 20-25 gallons/acre. In some embodiments, the rate of application of the liquid composition in a foliar application may comprise a rate in the range of 25-30 gallons/acre. In some embodiments, the rate of application of the liquid composition in a foliar application may comprise a rate in the range of 30-35 gallons/acre. In some embodiments, the rate of application of the liquid composition in a foliar application may comprise a rate in the range of 35-40 gallons/acre. In some embodiments, the rate of application of the liquid composition in a foliar application may comprise a rate in the range of 40-45 gallons/acre. In some embodiments, the rate of application of the liquid composition in a foliar application may comprise a rate in the range of 45-50 gallons/acre.

In some embodiments, the rate of application of the liquid composition in a foliar application may comprise a rate in the range of 0.01-10 gallons/acre. In some embodiments, the rate of application of the liquid composition in a foliar application may comprise a rate in the range of 0.01-0.1 gallons/acre. In some embodiments, the rate of application of the liquid composition in a foliar application may comprise a rate in the range of 0.1-1.0 gallons/acre. In some embodiments, the rate of application of the liquid composition in a foliar application may comprise a rate in the range of 1-2 gallons/acre. In some embodiments, the rate of application of the liquid composition in a foliar application may comprise a rate in the range of 2-3 gallons/acre. In some embodiments, the rate of application of the liquid composition in a foliar application may comprise a rate in the range of 3-4 gallons/acre. In some embodiments, the rate of application of the liquid composition in a foliar application may comprise a rate in the range of 4-5 gallons/acre. In some embodiments, the rate of application of the liquid composition in a foliar application may comprise a rate in the range of 5-10 gallons/acre.

In some implementations, a frequency of the application of one or more of the compositions, described herein, may be expressed as the number of applications per period of time (e.g., two applications per month), or by the period of time between applications (e.g., one application every 21 days). In some embodiments, the composition can be applied to the plant matter, such as in a foliar application, every 3-28 days. In some embodiments, the plant may be contacted by the composition in a foliar application every 4-10 days. In some embodiments, the composition can be applied to the plant matter, such as in a foliar application, every 18-24 days. In some embodiments, the composition can be applied to the plant matter, such as in a foliar application, every 3-7 days. In some embodiments, the composition can be applied to the plant matter, such as in a foliar application, every 7-14 days. In some embodiments, the composition can be applied to the plant matter, such as in a foliar application, every 14-21 days. In some embodiments, the composition can be applied to the plant matter, such as in a foliar application, every 21-28 days.

As an illustrative example, foliar application(s) of the composition can generally begin after the plant has become established, but may begin before establishment, at a defined time period after planting, or at a defined time period after emergence from the soil in some embodiments. In some embodiments, the composition can be first applied to the plant in a foliar application 5-14 days after the plant emerges from the soil. In some embodiments, the composition can be first applied to the plant in a foliar application 5-7 days after the plant emerges from the soil. In some embodiments, the composition can be first applied to the plant in a foliar application 7-10 days after the plant emerges from the soil. In some embodiments, the composition can be first applied to the plant in a foliar application 10-12 days after the plant emerges from the soil. In some embodiments, the composition can be first applied to the plant in a foliar application 12-14 days after the plant emerges from the soil.

Soil Application—Plant

In another non-limiting embodiment, the administration of one or more of the compositions, described herein, may comprise applying the composition to soil in the immediate vicinity of the plant with an effective amount of the composition. In some embodiments, one or more of the liquid compositions, described herein, may be applied to the soil by injection into to a low volume irrigation system, such as but not limited to a drip irrigation system supplying water beneath the soil through perforated conduits or at the soil level by fluid conduits hanging above the ground or protruding from the ground. In some embodiments, the liquid composition may be supplied to the soil by a soil drench method wherein the liquid composition is poured on the soil.

In some implementations, one or more of the compositions, described herein, may be diluted to a lower concentration, as an effective amount in a capillary action application, by mixing a volume of the composition with a volume of water. As an example, the concentration of macroalgae sourced components found in the diluted composition can be calculated by multiplying the base concentration in the composition by the ratio of the volume of the composition to the volume of water. Alternatively, the weight (e.g., in grams) of macroalgae sourced components found in the diluted composition can be calculated by multiplying the original weight of base macroalgae sourced components per volume (e.g., in milliliters (mL)) by the ratio of the volume of the composition to the volume of water.

In some embodiments, a rate of application of the composition at the desired concentration may be expressed as a volume of composition per area of land. In some embodiments, the rate of application of the liquid composition in a soil application may comprise a rate in the range of 50-150 gallons/acre. In some embodiments, the rate of application of the liquid composition in a soil application may comprise a rate in the range of 75-125 gallons/acre. In some embodiments, the rate of application of the liquid composition in a soil application may comprise a rate in the range of 50-75 gallons/acre. In some embodiments, the rate of application of the liquid composition in a soil application may comprise a rate in the range of 75-100 gallons/acre. In some embodiments, the rate of application of the liquid composition in a soil application may comprise a rate in the range of 100-125 gallons/acre. In some embodiments, the rate of application of the liquid composition in a soil application may comprise a rate in the range of 125-150 gallons/acre.

In some embodiments, the rate of application of the liquid composition in a soil application may comprise a rate in the range of 10-50 gallons/acre. In some embodiments, the rate of application of the liquid composition in a soil application may comprise a rate in the range of 10-20 gallons/acre. In some embodiments, the rate of application of the liquid composition in a soil application may comprise a rate in the range of 20-30 gallons/acre. In some embodiments, the rate of application of the liquid composition in a soil application may comprise a rate in the range of 30-40 gallons/acre. In some embodiments, the rate of application of the liquid composition in a soil application may comprise a rate in the range of 40-50 gallons/acre.

In some embodiments, the rate of application of the liquid composition in a soil application may comprise a rate in the range of 0.01-10 gallons/acre. In some embodiments, the rate of application of the liquid composition in a soil application may comprise a rate in the range of 0.01-0.1 gallons/acre. In some embodiments, the rate of application of the liquid composition in a soil application may comprise a rate in the range of 0.1-1.0 gallons/acre. In some embodiments, the rate of application of the liquid composition in a soil application may comprise a rate in the range of 1-2 gallons/acre. In some embodiments, the rate of application of the liquid composition in a soil application may comprise a rate in the range of 2-3 gallons/acre. In some embodiments, the rate of application of the liquid composition in a soil application may comprise a rate in the range of 3-4 gallons/acre. In some embodiments, the rate of application of the liquid composition in a soil application may comprise a rate in the range of 4-5 gallons/acre. In some embodiments, the rate of application of the liquid composition in a soil application may comprise a rate in the range of 5-10 gallons/acre.

In some embodiments, the rate of application of the liquid composition in a soil application may comprise a rate in the range of 2-20 liters/acre. In some embodiments, the rate of application of the liquid composition in a soil application may comprise a rate in the range of 3.7-15 liters/acre. In some embodiments, the rate of application of the liquid composition in a soil application may comprise a rate in the range of 2-5 liters/acre. In some embodiments, the rate of application of the liquid composition in a soil application may comprise a rate in the range of 5-10 liters/acre. In some embodiments, the rate of application of the liquid composition in a soil application may comprise a rate in the range of 10-15 liters/acre. In some embodiments, the rate of application of the liquid composition in a soil application may comprise a rate in the range of 15-20 liters/acre.

In some implementations, a frequency of the application of the composition may be expressed as the number of applications of the composition per period of time (e.g., two applications per month), or by the period of time between applications (e.g., one application every 21 days). In some embodiments, the composition can be applied to the soil every 3-28 days. In some embodiments, the composition can be applied to the soil every 4-10 days. In some embodiments, the composition can be applied to the soil every 18-24 days. In some embodiments, the composition can be applied to the soil every 3-7 days. In some embodiments, the composition can be applied to the soil every 7-14 days. In some embodiments, the composition can be applied to the soil every 14-21 days. In some embodiments, the composition can be applied to the soil every 21-28 days.

As an illustrative example, soil application(s) of the composition can generally begin after the plant has become established, but may begin before establishment, such as at a defined time period after planting, or at a defined time period after emergence from the soil. In some embodiments, the composition may first be applied to the plant, using a soil application, 5-14 days after the plant emerges from the soil. In some embodiments, the composition may first be applied to the plant, using a soil application, 5-7 days after the plant emerges from the soil. In some embodiments, the composition may first be applied to the plant, using a soil application, 7-10 days after the plant emerges from the soil. In some embodiments, the composition may first be applied to the plant, using a soil application, 10-12 days after the plant emerges from the soil. In some embodiments, the composition may first be applied to the plant, using a soil application, 12-14 days after the plant emerges from the soil.

In one aspect, whether the compositions, described herein, are applied in a seed soak, soil, capillary action, foliar, aeroponic, or hydroponic application, the method of use can comprise relatively low concentrations of the composition. As an illustrative example, even at low concentrations, the one or more compositions, described herein, can be effective at producing one or more enhanced characteristic in plants. In this example, the ability to use low concentrations may allow for a reduced impact on the environment, result from less application of the product, and an increased efficiency in the method of use of the composition from the small amount of material producing the desired effect. In some embodiments, the use of one or more of the liquid compositions, described herein, with a low volume irrigation system in soil applications may allow for a low concentration of the liquid composition to remain effective. This may also provide for an increase in efficiency of a grower's water use.

In this aspect, in conjunction with the low concentrations of algal extracts in the composition that are effective for enhancing the described characteristics of plants, the composition may be administered at lower frequencies. That is, for example, due to the efficacy of the one or more compositions, described herein, at low concentrations, they may not need be to be administered continuously or at a high frequency (e.g., multiple times per day, daily). The ability of the composition to be effective at low concentrations and a low frequency of application was an unexpected result, due to the traditional thinking that as the concentration of active ingredients decreases the frequency of application should increase to provide adequate amounts of the active ingredients. Effectiveness at low concentration and low application frequency can increase the material usage efficiency of the method of using the composition while also increasing the yield efficiency of the agricultural process.

In one aspect, a dry composition treatment can be administered to the soil, seed, or plant in an amount that is effective to produce an enhanced characteristic in the plant, when compared to a substantially identical population of untreated plant. In this aspect, the enhanced characteristics can comprise accelerated seed germination, accelerated seedling emergence, improved seedling emergence, improved leaf formation, accelerated leaf formation, improved plant maturation, accelerated plant maturation, increased plant yield, increased plant growth, increased plant quality, increased plant health, increased flowering, increased fruit yield, increased fruit growth, and/or increased fruit quality. A non-limiting example of such enhanced characteristics can comprise increased germination rate, accelerated achievement of the hypocotyl stage, accelerated protrusion of a stem from the soil, accelerated achievement of the cotyledon stage, accelerated leaf formation, increased leaf size, increased leaf area index, increased marketable plant weight, increased marketable plant yield, increased marketable fruit weight, increased production plant weight, increased production fruit weight, increased utilization (e.g., indicator of efficiency in the agricultural process based on ratio of marketable fruit to unmarketable fruit), increased chlorophyll content (e.g., indicator of plant health), increased plant weight (e.g., indicator of plant health), increased root weight (e.g., indicator of plant health), increased root mass (e.g., indicator of plant health), increased shoot weight (e.g., indicator of plant health), increased plant height, increased thatch height, increased resistance to salt stress, increased plant resistance to heat stress (e.g., temperature stress), increased plant resistance to heavy metal stress, increased plant resistance to drought, increased plant resistance to disease, improved color, reduced insect damage, reduced blossom end rot, and/or reduced sun burn. As an example, such enhanced characteristics can occur individually in a plant, or in combinations of multiple enhanced characteristics. For example, improved flowering characteristics may be desirable for the ornamental market, and for fruiting plants where an increase in flowering may correlate to an increase in fruit production.

Seed Coating

In one non-limiting embodiment, the administration of the algal extracts compositions, described herein, can comprise application of a coating to a seed. In some embodiments, a seed may be coated by passing the seed through a slurry comprising one or more of the algal compositions, described herein, and then drying the seed. In some embodiments, the seed may be coated with the algal composition along with other components such as, but not limited to, binders and fillers that are suitable for coating seeds. As an example, the fillers may comprise suitable inorganic particles such as, but not limited to, silicate particles, carbonate particles, and sulphate particles, quartz, zeolites, pumice, perlite, diatomaceous earth, pyrogene silica, $Sb_2O_3$, $TiO_2$, lithopone, ZnO, and hydrated aluminum oxide. As another example, the binders may include, but are not limited to, water-soluble polymers, polyvinyl acetate, polyvinyl alcohol, polyvinyl pyrrolidone, polyurethane, methyl cellulose, carboxymethyl cellulose, hydroxylpropyl cellulose, sodium alginate, polyacrylate, casein, gelatin, pullulan, polyacrylamide, polyethylene oxide, polystyrene, styrene acrylic copolymers, styrene butadiene polymers, poly (N-vinylacetamide), waxes, carnauba wax, paraffin wax, polyethylene wax, beeswax, polypropylene wax, and ethylene vinyl acetate. In some embodiments, the seed coating may comprise a wetting and dispersing additive such as, but not limited to polyacrylates, organo-modified polyacrylates, sodium polyacrylates, polyurethanes, phosphoric acid esters, star polymers, and modified polyethers.

In some embodiments, the seed coating may comprise other components such as, but not limited to, a solvent, thickener, coloring agent, anti-foaming agent, biocide, surfactant, and/or pigment. In some embodiments, the seed coating may comprise a hydrogel or film coating materials. In some embodiments, the concentration of algal components in the seed coating may comprise 0.001-20% solids. In some embodiments, the concentration of algal components in the seed coating may comprise less than 0.1% solids. In some embodiments, the concentration of algal components in the seed coating may comprise 0.001-0.01% solids. In some embodiments, the concentration of algal components in the seed coating may comprise 0.01-0.1% solids. In some embodiments, the concentration of algal components in the seed coating may comprise 0.1-1% solids. In some embodiments, the concentration of algal components in the seed coating may comprise 1-2% solids. In some embodiments, the concentration of algal components in the seed coating may comprise 2-3% solids. In some embodiments, the concentration of algal components in the seed coating may comprise 3-5% solids. In some embodiments, the concentration of algal components in the seed coating may comprise 5-10% solids. In some embodiments, the concentration of algal components in the seed coating may comprise 10-15% solids. In some embodiments, the concentration of algal components in the seed coating may comprise 15-20% solids. In some embodiments, the seed may be coated in a single step. In some embodiments, the seed may be coated in multiple steps. Suitable equipment for coating seeds can comprise drum coaters, fluidized beds, rotary coaters, side vented pan, tumble mixers, and spouted beds. Suitable techniques may comprise mixing in a container, tumbling, spraying, or immersion. In some embodiments, after coating, the seeds may be dried or partially dried.

Soil Application

In another non-limiting embodiment, the administration of one or more of the algal components compositions, described herein, can comprise mixing an effective amount of the composition with a solid growth medium, such as soil, potting mix, compost, or inert hydroponic material, prior to planting a seed, seedling, or plant in the solid growth medium. As an example, the algal components composition may be mixed in the solid growth medium at an inclusion level of 0.001-20% by volume. In some embodiments, an effective amount of the algal components composition in a mixed solid growth medium application can comprise a concentration in the range of 0.001-0.01% solids. In some embodiments, an effective amount of the algal components composition in a mixed solid growth medium application can comprise a concentration in the range of 0.01-0.1% solids. In some embodiments, an effective amount of the algal components composition in a mixed solid growth medium application can comprise a concentration in the range of 0.1-1% solids. In some embodiments, an effective amount of the algal components composition in a mixed solid growth medium application can comprise a concentration in the range of 1-3%% solids. In some embodiments, an effective amount of the algal components composition in a mixed solid growth medium application can comprise a concentration in the range of 3-5% solids. In some embodiments, an effective amount of the algal components composition in a mixed solid growth medium application can comprise a concentration in the range of 5-10% solids. In some embodiments, an effective amount of the algal components composition in a mixed solid growth medium application can comprise a concentration in the range of 10-20% solids.

In another non-limiting embodiment, the administration of one or more of the algal compositions, described herein, can comprise inclusion of the composition in a solid growth medium, such as during in-furrow plants or broadcast application to the ground. As an example, the algal composition may be applied at a rate of 50-500 grams/acre. In some embodiments, the application rate of the dried algal composition can comprise 50-100 grams/acre. In some embodiments, the application rate of the algal composition can comprise 100-150 grams/acre. In some embodiments, the application rate of the algal composition can comprise 150-200 grams/acre. In some embodiments, the application rate of the algal composition can comprise 200-250 grams/acre. In some embodiments, the application rate of the algal composition can comprise 250-300 grams/acre. In some embodiments, the application rate of the algal composition can comprise 300-350 grams/acre. In some embodiments, the application rate of the algal composition can comprise 350-400 grams/acre. In some embodiments, the application rate of the algal composition can comprise 400-450 grams/acre. In some embodiments, the application rate of the algal composition can comprise 450-500 grams/acre.

In some embodiments, the algal composition may be applied at a rate of 10-50 grams/acre. In some embodiments, the application rate of the algal composition can comprise 10-20 grams/acre. In some embodiments, the application rate of the algal composition can comprise 20-30 grams/acre. In some embodiments, the application rate of the algal composition can comprise 30-40 grams/acre. In some embodiments, the application rate of the algal composition can comprise 40-50 grams/acre.

In some embodiments, the algal composition may be applied at a rate of 0.001-10 grams/acre. In some embodiments, the application rate of the algal composition can comprise 0.001-0.01 grams/acre. In some embodiments, the application rate of the algal composition can comprise 0.01-0.1 grams/acre. In some embodiments, the application rate of the algal composition can comprise 0.1-1.0 grams/acre. In some embodiments, the application rate of the algal composition can comprise 1-2 grams/acre. In some embodiments, the application rate of the algal composition can comprise 2-3 grams/acre. In some embodiments, the application rate of the algal composition can comprise 3-4 grams/acre. In some embodiments, the application rate of the algal composition can comprise 4-5 grams/acre. In some embodiments, the application rate of the algal composition can comprise 5-10 grams/acre.

EXAMPLES

Embodiments of the compositions, method, and systems are exemplified and additional embodiments are disclosed in further detail in the following Examples, which are not in any way intended to limit the scope of any aspect of the inventive concepts described herein.

Example 1

Fabaceae (Leguminosae)

Demonstrations are performed to illustrate the effects of application of a *Laminaria* based composition (e.g., algal composition) to crop plants of the family Fabaceae (Leguminosae). Application of the algal composition is performed, as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 2

Poaceae

Demonstrations are performed to illustrate the effects of application of a *Laminaria* based composition (e.g., algal composition) to crop plants of the family Poaceae. Application of the algal composition is performed, as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 3

Roasaceae

Demonstrations are performed to illustrate the effects of application of a *Laminaria* based composition (e.g., algal composition) to crop plants of the family Roasaceae. Application of the algal composition is performed, as in other examples herein, such that, in various treatments, (a) seeds are wetted or soaked in the composition; ((b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 4

Vitaceae

Demonstrations are performed to illustrate the effects of application of a *Laminaria* based composition (e.g., algal composition) to crop plants of the family Vitaceae. Application of the algal composition is performed, as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 5

Brassicaeae (Cruciferae)

Demonstrations are performed to illustrate the effects of application of a *Laminaria* based composition (e.g., algal composition) to crop plants of the family Brassicaeae (Cruciferae). Application of the algal composition is performed, as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 6

Caricaceae

Demonstrations are performed to illustrate the effects of application of a *Laminaria* based composition (e.g., algal composition) to crop plants of the family Caricaceae. Application of the algal composition is performed, as in other examples herein, such that, in various treatments, (a) seeds are wetted or soaked in the composition; ((b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 7

Malvaceae

Demonstrations are performed to illustrate the effects of application of a *Laminaria* based composition (e.g., algal composition) to crop plants of the family Malvaceae. Application of the algal composition is performed, as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 8

Sapindaceae

Demonstrations are performed to illustrate the effects of application of a *Laminaria* based composition (e.g., algal composition) to crop plants of the family Sapindaceae. Application of the algal composition is performed, as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 9

Anacardiaceae

Demonstrations are performed to illustrate the effects of application of a *Laminaria* based composition (e.g., algal composition) to crop plants of the family Anacardiaceae. Application of the algal composition is performed, as in other examples herein, such that, in various treatments, (a) seeds are wetted or soaked in the composition; (b) seeds are coated in the composition; (c) the composition is mixed with a solid growth medium before planting the seeds; (d) the composition is applied to soil pre-germination; (e) the composition is applied to soil post-germination; (f) the composition is applied periodically to soil during the growing season; and/or (g) the composition is applied to leaves of the plants once or periodically during the growing season. Results are measured for appropriate plant characteristics including: seed germination rate, seed germination time, seedling emergence, seedling emergence time, seedling size, plan fresh weight, plant dry weight, utilization, fruit production, leaf production, leaf formation, leaf size, leaf area index, plant height, thatch height, plant health, plant resistance to salt stress, plant resistance to heat stress, plant resistance to heavy metal stress, plant resistance to drought, maturation time, yield, root length, root mass, color, insect damage, blossom end rot, softness, plant quality, fruit quality, flowering, and sun burn. Results of this demonstration illustrate at least a 10% quantitative improvement and/or a statistically significant improvement as to at least one characteristic under at least one mode of application (a-g) of the composition.

Example 10

A demonstration was performed to illustrate the effects of treating *Arabidopsis thaliana* with an extract of *Laminaria* under typical growth conditions, and under salt stressed conditions. In this demonstration, the *Laminaria* biomass was subjected to an ethanol extraction process. A bioassay was initiated using four day old *Arabidopsis thaliana* plantlets grown on half strength Murashige and Skoog (MS) medium, supplemented with 1% (w/v) sucrose and solidified with 0.4% (w/v) Phytagel in square petri plates. Plates were vertically stacked in the growth chamber set at 22° C. with 16-h light/8-h dark cycle, with light intensity of 100 μmol/$m^{-2}s^{-1}$.

Each plate contained five replicate plantlets. Plantlets were transferred to medium supplemented with concentrations of an extract of *Laminaria* and compared to an untreated control. Concentrations of the extract of *Laminaria* includes: 0.1% (0.1 mL/L), 0.01% (0.01 mL/L), or 0.001% (0.001 mL/L) of extracted whole lysed biomass; 0.01% (0.01 mL/L), 0.001% (0.001 mL/L), or 0.0001% (0.0001 mL/L) of extracted oil; and 0.1% (0.1 mL/L), 0.01% (0.01 mL/L), or 0.001% (0.001 mL/L) of extracted biomass. Each concentration of each treatment was tested in triplicate.

In this demonstration, the *Laminaria* treatments were prepared in steps. One-hundred grams of biomass is weighed; and the biomass is heated at 95-90° C. for 1 hour with a solution of 30 g of NaOH (e.g., KOH is also suitable) in 1,000 mL of water. After the heating step, the reaction mixture is drained and the biomass is washed three times with water until the alkaline solution is substantially removed. The alkaline solution is then neutralized by the addition of sulfuric acid to reach a pH in the range of 6-8, and freeze dried to obtain a hydrolysis extract fraction. The filtered biomass is then soaked in 1 liter of a 0.01% hydrochloric acid solution for 10 minutes and washed three times with water. The washed biomass is suspended in 700 mL of water and heated to reflux for 1 hour, blended, and the resulting paste and wash is heated for 3 hours at 95° C. The biomass is freeze dried and processed with ethanol to produce an extract treatment for application to plants. The ethanol extract process comprises, mixing 600 grams of biomass with 3,000 mL of ethanol, and heating at reflux for 2 hours. The reaction mixture is filtered while hot, and the biomass is extracted again with ethanol twice (2 times at 3,000 mL). The combined organic extracts from the process are concentrated to yield the extract treatment.

In this demonstration, the salt stressed plantlets are supplemented with 100 mM of NaCl. Seven days after the plantlets are treated, plant dry weight, root length, amount of chlorotic leaves, and the amount of plants with chlorosis are measured. Results are illustrated in Tables 1-3, which display the results for each demonstrated concentration with respect to an untreated control. For chlorosis metric, the reduction in the effect of chlorosis with respect to the control (e.g., improvement over the control) is represented as a negative (−) value.

TABLE 1

Growth (No Salt Stress)

| Treatment | Concentration | Dry Weight % Difference vs. Control |
|---|---|---|
| Whole Lysed Biomass | 0.1% | −18.0 |
| | 0.01% | −38.3 |
| | 0.001% | +4.3 |
| Extracted Oil | 0.01% | −68.1 |
| | 0.001% | −50.5 |
| | 0.0001% | −14.7 |
| Extracted Biomass | 0.1% | −54.4 |
| | 0.01% | −15.9 |
| | 0.001% | +2.9 |

TABLE 2

Salt Stress

| Treatment | Concentration | Dry Weight % Difference vs. Control |
|---|---|---|
| Whole Lysed Biomass | 0.1% | −2.8 |
| | 0.01% | +4.2 |
| | 0.001% | +49.3 |
| Extracted Oil | 0.01% | −25.3 |
| | 0.001% | −51.4 |
| | 0.0001% | −53.1 |
| Extracted Biomass | 0.1% | +19.8 |
| | 0.01% | +26.7 |
| | 0.001% | +61.5 |

TABLE 3

Chlorosis

| Treatment | Concentration | Chlorotic leaves % Difference vs. Control | Plants with Chlorosis % Difference vs. Control |
|---|---|---|---|
| Whole Lysed Biomass | 0.1% | −18.7 | +16.7 |
| | 0.01% | −43.1 | −8.3 |
| | 0.001% | −70.5 | −16.7 |
| Extracted Oil | 0.01% | −24.8 | +16.7 |
| | 0.001% | +9.8 | +8.3 |
| | 0.0001% | +37.2 | +25.0 |
| Extracted Biomass | 0.1% | −58.5 | −32.7 |
| | 0.01% | −59.3 | −58.3 |
| | 0.001% | −73.6 | −58.3 |

Example 11

A demonstration was performed to illustrate the effects of treating *Arabidopsis thaliana* with *Laminaria* whole and extracted biomass under typical growth conditions, and under salt stressed conditions. A bioassay was initiated using two week old *Arabidopsis* plants grown on Jiffy pellets (peat moss pellets). Five replicates of each plant were performed for the treatments. Plants on Jiffy pellets were placed on trays with concentrations of 0.1% (0.1 mL/L), 0.01% (0.01 mL/L), or 0.001% (0.001 mL/L) of *Laminaria* whole or extracted biomass at 40 mL/plant, and compared to an untreated control. The treatments were prepared as described in Example 10. The salt stressed plantlets were also supplemented with 150 mM of NaCl. Five days after the first treatment the *Laminaria*, treatments were repeated, but additional salt was not added. Ten days after the first treatment the plant, dry weight was measured. The results are shown in Tables 4-5, which illustrate results for each tested concentration with respect to the untreated control.

TABLE 4

Growth (No Salt Stress)

| Treatment | Concentration | Dry Weight % Difference vs. Control |
|---|---|---|
| Whole Lysed Biomass | 0.1% | −39.3 |
|  | 0.01% | +10.2 |
|  | 0.001% | +4.7 |
| Extracted Biomass | 0.1% | −33.9 |
|  | 0.01% | +19.8 |
|  | 0.001% | +6.8 |

TABLE 5

Salt Stress

| Treatment | Concentration | Dry Weight % Difference vs. Control |
|---|---|---|
| Whole Lysed Biomass | 0.1% | −27.2 |
|  | 0.01% | +40.2 |
|  | 0.001% | +31.7 |
| Extracted Biomass | 0.1% | −28.2 |
|  | 0.01% | +17.0 |
|  | 0.001% | +12.2 |

Example 12

A demonstration was performed to illustrate the effects of treating *Arabidopsis thaliana* with an extract of *Laminaria* under typical growth conditions, and under temperature stressed conditions. A bioassay was initiated using four day old *Arabidopsis thaliana* plantlets grown on half strength Murashige and Skoog (MS) medium, supplemented with 1% (w/v) sucrose and solidified with 0.7% (w/v) agar in square petri plates. Plates were vertically stacked in the growth chamber set at 22° C. with 16-h light/8-h dark cycle, with light intensity of 100 $\mu mol/m^{-2}s^{-1}$. Each plate contained five replicate plantlets. Plantlets were transferred to medium supplemented with an extract of *Laminaria* and compared to an untreated control. The extract concentrations included: 0.01% (0.01 mL/L), or 0.001% (0.001 mL/L) of extracted whole lysed biomass; 0.000% (0.001 mL/L), or 0.0001% (0.0001 mL/L) of extracted oil; and 0.01% (0.01 mL/L), or 0.001% (0.001 mL/L) of extracted biomass. The treatments were prepared as described in Example 10. After seven days, half of the plates were placed in a growth chamber and subjected to three days of continuous temperature stress (35° C.), while the other half were maintained at about 22° C. Following the temperature stress period, the plantlets were allowed to grow for seven additional days, and plant dry weight was measured at the end. The results are shown in Tables 6-7, which illustrate the results for each demonstrated concentration with respect to the untreated control.

TABLE 6

Growth (No temperature Stress)

| Treatment | Concentration | Dry Weight % Difference vs. Control |
|---|---|---|
| Whole Lysed Biomass | 0.01% | −40.5 |
|  | 0.001% | +27.5 |
| Extracted Oil | 0.001% | −43.8 |
|  | 0.0001% | −8.6 |

TABLE 6-continued

Growth (No temperature Stress)

| Treatment | Concentration | Dry Weight % Difference vs. Control |
|---|---|---|
| Extracted Biomass | 0.01% | +1.3 |
|  | 0.001% | +28.2 |

TABLE 7

Temperature Stress

| Treatment | Concentration | Dry Weight % Difference vs. Control |
|---|---|---|
| Whole Lysed Biomass | 0.01% | −17.9 |
|  | 0.001% | +13.7 |
| Extracted Oil | 0.001% | −17.4 |
|  | 0.0001% | +33.3 |
| Extracted Biomass | 0.01% | +12.1 |
|  | 0.001% | +35.9 |

Example 13

A demonstration was performed to illustrate the effects of treating *Phaseolus aureus* (mung bean) with an extract of *Laminaria* under typical growth conditions. The biomass was initiated using cut mung bean seedlings, which were grown in vials supplemented with extract of *Laminaria* and compared to an untreated control. The concentrations of extract of *Laminaria* included: 0.1% (0.1 mL/L), 0.01% (0.01 mL/L), or 0.001% (0.001 mL/L) of extracted whole lysed biomass; 0.01% (0.01 mL/L), 0.001% (0.001 mL/L), or 0.0001% (0.0001 mL/L) of extracted oil; and 0.1% (0.1 mL/L), 0.01% (0.01 mL/L), or 0.001% (0.001 mL/L) of extracted biomass.

The mung bean seedlings were initially grown on vermiculite for two weeks and then cut approximately 3 cm below the cotyledons. Cut seedlings were placed in glass scintillation vials to which 15 mL of water or treatments were added. The treatments were prepared as described in Example 10. Five seedlings were used for each treatment. The root growth parameters of distance of root growth from meristem, number of roots, and root length were measured after 7 days. The results are shown in Table 8, which display the results for each tested concentration with respect to the untreated control.

TABLE 8

| Treatment | Concentration | Distance of Root Growth from Meristem % Difference vs. Control | Number of Roots % Difference vs. Control | Root Length % Difference vs. Control |
|---|---|---|---|---|
| Whole Lysed Biomass | 0.1% | +95.9 | −4.0 | +109.2 |
|  | 0.01% | −14.5 | +14.5 | +6.7 |
|  | 0.001% | −17.2 | +18.5 | +10.3 |
| Extracted Oil | 0.01% | +100.0 | +59.6 | +82.5 |
|  | 0.001% | +93.3 | +9.5 | +24.0 |
|  | 0.0001% | +76.7 | −7.4 | +36.0 |
| Extracted Biomass | 0.1% | +194.4 | +12.3 | +190.0 |
|  | 0.01% | +30.0 | +31.9 | +62.0 |
|  | 0.001% | −22.2 | −1.8 | −10.0 |

Aspects of the Methods, Compositions, and Systems Described Herein

In one non-limiting embodiment, a method of plant enhancement may comprise administering a composition treatment, comprising 0.001-0.1% by weight of *Laminaria* whole biomass, to a plant, seedling, or seed to enhance at least one plant characteristic. In some embodiments, the *Laminaria* whole biomass may be applied to a plant in at least one of heat stress and salt stress conditions.

In another non-limiting embodiment, a composition may comprise *Laminaria* whole biomass, in a concentration in the range of 0.001-0.1% by weight.

In another non-limiting embodiment, a method of preparing a composition may comprise diluting the concentration of *Laminaria* whole biomass to a concentration in the range of 0.001-0.1% by weight.

In one non-limiting embodiment, a method of plant enhancement may comprise administering a composition treatment, comprising 0.001-0.1% by weight of *Laminaria* cells subjected to an oil extraction process, to a plant, seedling, or seed to enhance at least one plant characteristic. In some embodiments, the *Laminaria* cells subjected to an oil extraction process may be applied to a plant in at least one of heat stress and salt stress conditions.

In another non-limiting embodiment, a composition may comprise *Laminaria* cells subjected to an oil extraction process, in a concentration in the range of 0.001-0.1% by weight.

In another non-limiting embodiment, a method of preparing a composition may comprise subjecting *Laminaria* cells to an oil extraction process; separating the extracted oil from the extracted biomass; and diluting the concentration of extracted biomass to a concentration in the range of 0.001-0.1% by weight.

In one non-limiting embodiment, a method of plant enhancement may comprise administering a composition treatment, comprising 0.0001-0.01% by weight of extracted *Laminaria* oil, to a plant, seedling, or seed to enhance at least one plant characteristic. In some embodiments, the extracted *Laminaria* oil is applied to a plant in at least one of heat stress and salt stress conditions.

In another non-limiting embodiment, a composition may comprise extracted *Laminaria* oil, in a concentration in the range of 0.0001-0.01% by weight.

In another non-limiting embodiment, a method of preparing a composition may comprise subjecting *Schizochytrium* cells to an oil extraction process; separating the extracted oil from the extracted biomass; and diluting the concentration of extracted oil to a concentration in the range of 0.0001-0.01% by weight.

All references, including publications, patent applications, and patents, cited herein are hereby incorporated by reference in their entirety and to the same extent as if each reference were individually and specifically indicated to be incorporated by reference and were set forth in its entirety herein (to the maximum extent permitted by law), regardless of any separately provided incorporation of particular documents made elsewhere herein.

Unless otherwise stated, all exact values provided herein are representative of corresponding approximate values (e.g., all exact exemplary values provided with respect to a particular factor or measurement can be considered to also provide a corresponding approximate measurement, modified by "about," where appropriate). All provided ranges of values are intended to include the end points of the ranges, as well as values between the end points.

The citation and incorporation of patent documents herein is done for convenience only and does not reflect any view of the validity, patentability, and/or enforceability of such patent documents.

The inventive concepts described herein include all modifications and equivalents of the subject matter recited in the claims and/or aspects appended hereto as permitted by applicable law.

Although a particular feature of the disclosed techniques and systems may have been disclosed with respect to only one of several implementations, such feature may be combined with one or more other features of the other implementations as may be desired and advantageous for any given or particular application. Also, to the extent that the terms "including", "includes", "having", "has", "with", or variants thereof are used in the detailed description and/or in the claims, such terms are intended to be inclusive in a manner similar to the term "comprising."

This written description uses examples to disclose the claimed subject matter, including the best mode, and also to enable one of ordinary skill in the art to practice the claimed subject matter, including making and using any devices or systems and performing any incorporated methods. The patentable scope of the inventive concepts, described herein, are defined by the claims, and may include other examples that occur to those skilled in the art. Such other examples are intended to be within the scope of the claims if they have structural elements that are not different from the literal language of the claims, or if they include equivalent structural elements with insubstantial differences from the literal language of the claims.

In the specification and claims, reference will be made to a number of terms that have the following meanings. The singular forms "a", "an" and "the" include plural referents unless the context clearly dictates otherwise. Approximating language, as used herein throughout the specification and claims, may be applied to modify a quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Moreover, unless specifically stated otherwise, a use of the terms "first," "second," etc., do not denote an order or importance, but rather the terms "first," "second," etc., are used to distinguish one element from another.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

The best mode for carrying out the claimed subject matter has been described for purposes of illustrating the best mode known to the applicant at the time and enable one of ordinary skill in the art to practice the claimed subject matter, including making and using devices or systems and performing incorporated methods. The examples are illustrative only and not meant to limit the claimed subject matter, as measured by the scope and merit of the claims. The claimed subject matter has been described with reference to preferred and alternate embodiments. Obviously, modifications and alterations will occur to others upon the reading and understanding of the specification. It is intended to include all such modifications and alterations insofar as they come within the scope of the appended claims or the equivalents thereof. The patentable scope of the inventive concepts, described herein, are defined by the claims, and may include other examples that occur to one of ordinary skill in the art. Such other examples are intended to be within the scope of the claims if they have structural elements that do not differentiate from the literal language of the claims, or if they include equivalent structural elements with insubstantial differences from the literal language of the claims.

What is claimed is:

1. A method for plant enhancement, comprising:
   administering an algal composition treatment to a plant, a portion of a plant, a seedling, or seed in an amount effective to enhance at least one plant characteristic compared to a substantially identical untreated plant, portion of a plant, seedling, or seed,
   the composition comprising 0.0001 to 0.1% extract of a *Laminaria* biomass by weight of the composition,
   wherein the extract of the *Laminaria* biomass comprises *Laminaria* cells subjected to an oil extraction process and the plant characteristic is selected from the group consisting of seedling size, plant fresh weight, plant dry weight, plant resistance to salt stress, plant resistance to heat stress, root length, root mass, and reduced chlorosis.

2. The method of claim 1, wherein administering the algal composition treatment further comprises contacting soil in an immediate vicinity of the plant, seedling, or seed with an effective amount of the composition.

3. The method of claim 1, wherein administering the algal composition treatment comprises administration through a hydroponic circulation system, an irrigation system, an above ground drip irrigation system, a buried drip irrigation system, an aeroponic irrigation system, a central pivot irrigation system, sprayers, sprinklers, or water cans.

4. The method of claim 1, wherein administering the algal composition treatment comprises utilizing an application rate of the composition of 0.001-10 gallons per acre.

5. The method of claim 1, wherein the algal composition treatment is administered in an amount effective to improve the dry weight of the plant compared to a substantially identical untreated plant.

6. The method of claim 1, wherein the algal composition treatment is administered in an amount effective to improve the resistance to salt stress of the plant compared to a substantially identical untreated plant.

7. The method of claim 1, wherein the algal composition treatment is administered in an amount effective to improve the resistance to heat stress of the plant compared to a substantially identical untreated plant.

8. The method of claim 1, wherein the algal composition treatment is administered in an amount effective to improve the root length of the plant compared to a substantially identical untreated plant.

9. The method of claim 1, wherein the algal composition treatment is administered in an amount effective to improve the root mass of the plant compared to a substantially identical untreated plant.

10. The method of claim 1, wherein the algal composition treatment is administered in an amount effective to reduce chlorosis in the plant compared to a substantially identical untreated plant.

11. A method for plant enhancement, comprising:
    administering an algal composition treatment to a plant, a portion of a plant, a seedling, or seed in an amount effective to enhance at least one plant characteristic compared to a substantially identical untreated plant, portion of a plant, seedling, or seed,
    the composition comprising 0.0001 to 0.1% extract of a *Laminaria* biomass by weight of the composition,
    wherein the extract of the *Laminaria* biomass is applied to a plant in at least one of heat stress and salt stress conditions and the plant characteristic is selected from the group consisting of seedling size, plant fresh weight, plant dry weight, plant resistance to salt stress, plant resistance to heat stress, root length, root mass, and reduced chlorosis.

12. The method of claim 11, wherein administering the algal composition treatment further comprises contacting soil in an immediate vicinity of the plant, seedling, or seed with an effective amount of the composition.

13. The method of claim 11, wherein administering the algal composition treatment comprises administration through a hydroponic circulation system, an irrigation system, an above ground drip irrigation system, a buried drip irrigation system, an aeroponic irrigation system, a central pivot irrigation system, sprayers, sprinklers, or water cans.

14. The method of claim 11, wherein administering the algal composition treatment comprises utilizing an application rate of the composition of 0.001-10 gallons per acre.

15. The method of claim 11, wherein the algal composition treatment is administered in an amount effective to improve the dry weight of the plant compared to a substantially identical untreated plant.

16. The method of claim 11, wherein the algal composition treatment is administered in an amount effective to improve the resistance to salt stress of the plant compared to a substantially identical untreated plant.

17. The method of claim 11, wherein the algal composition treatment is administered in an amount effective to improve the resistance to heat stress of the plant compared to a substantially identical untreated plant.

18. The method of claim 11, wherein the algal composition treatment is administered in an amount effective to improve the root length of the plant compared to a substantially identical untreated plant.

19. The method of claim 11, wherein the algal composition treatment is administered in an amount effective to improve the root mass of the plant compared to a substantially identical untreated plant.

20. The method of claim 11, wherein the algal composition treatment is administered in an amount effective to reduce chlorosis in the plant compared to a substantially identical untreated plant.

* * * * *